United States Patent
Han et al.

(10) Patent No.: US 8,707,045 B2
(45) Date of Patent: Apr. 22, 2014

(54) METHOD AND APPARATUS FOR TRAFFIC COUNT KEY MANAGEMENT AND KEY COUNT MANAGEMENT

(75) Inventors: Gene Beck Han, Gyeonggi-do (KR); Ki Seon Ryu, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 780 days.

(21) Appl. No.: 12/705,068

(22) Filed: Feb. 12, 2010

(65) Prior Publication Data
US 2010/0205442 A1    Aug. 12, 2010

Related U.S. Application Data

(60) Provisional application No. 61/219,404, filed on Jun. 23, 2009, provisional application No. 61/151,844, filed on Feb. 12, 2009, provisional application No. 61/153,259, filed on Feb. 17, 2009, provisional application No. 61/152,259, filed on Feb. 13, 2009, provisional application No. 61/169,724, filed on Apr. 16, 2009.

(30) Foreign Application Priority Data

Jul. 3, 2009 (KR) .................. 10-2009-0060764
Jan. 22, 2010 (KR) .................. 10-2010-0006041

(51) Int. Cl.
*H04K 1/00* (2006.01)
(52) U.S. Cl.
USPC ..................... 713/171; 380/272; 380/273

(58) Field of Classification Search
USPC ..................... 713/171; 380/272–273
See application file for complete search history.

(56) References Cited

U.S. PATENT DOCUMENTS

| 2002/0164035 | A1 | 11/2002 | Yokota et al. | |
| 2006/0285519 | A1* | 12/2006 | Narayanan et al. | 370/331 |
| 2008/0080713 | A1 | 4/2008 | Cho et al. | |
| 2009/0274302 | A1* | 11/2009 | Wu et al. | 380/272 |
| 2009/0280774 | A1* | 11/2009 | Patel et al. | 455/410 |
| 2010/0098247 | A1 | 4/2010 | Suumaki | |
| 2010/0167747 | A1* | 7/2010 | Karnam et al. | 455/450 |

FOREIGN PATENT DOCUMENTS

CN          101252432 A     8/2008
KR    10-2009-0126166       12/2009

OTHER PUBLICATIONS

J. Arkko et al., "MIKEY: Multimedia Internet KEYing," Internet Engineering Task Force, Feb. 2002.
The State Intellectual Property Office of the People's Republic of China Application Serial No. 201080007447.1, Office Action dated Sep. 3, 2013, 5 pages.

* cited by examiner

*Primary Examiner* — Kambiz Zand
*Assistant Examiner* — Ghodrat Jamshidi
(74) *Attorney, Agent, or Firm* — Lee, Hong, Degerman, Kang & Waimey

(57) ABSTRACT

Various methods and apparatuses for managing count values (e.g. key counts) to manage a TEK in various communication environments are disclosed. Also, various methods and apparatuses for generating and maintaining a traffic key encryption key by using key count values are disclosed.

18 Claims, 20 Drawing Sheets

METHOD AND APPARATUS FOR TRAFFIC COUNT KEY MANAGEMENT AND KEY COUNT MANAGEMENT

This application claims the benefit of U.S. provisional Application Ser. Nos. 61/219,404, filed on Jun. 23, 2009, 61/151,844, filed on Feb. 12, 2009, 61/153,259, filed on Feb. 17, 2009, 61/152,259, filed on Feb. 13, 2009, and 61/169,724, filed on Apr. 16, 2009, and also claims the benefit of earlier filing date and right of priority to Korean Patent Application Nos. 10-2010-0006041, filed on Jan. 22, 2010, and 10-2009-0060764, filed on Jul. 3, 2009, the contents of all of which are hereby incorporated by reference as if fully set forth herein.

TECHNICAL FIELD

The present invention relates to a method of managing and/or updating key count values for generating traffic encryption keys (TEKs) in various communication environments of a wireless access system and an apparatus through which the method can be carried out.

BACKGROUND ART

Hereinafter, an IEEE 802.16e (Institute of Electrical and Electronics Engineers 802.16e) system based protocol layer will be described in brief.

FIG. 1 is a diagram illustrating a protocol layer model defined in a wireless telecommunication system based on an IEEE 802.16e system which is generally used.

Referring to FIG. 1, a medium access control (MAC) layer belonging to a link layer includes three sublayers. First of all, a service-specific convergence sublayer converts or maps data of an external network, which are received through a service access point, into medium access control service data units (MAC SDUs) of a MAC common part sublayer (CPS). The service-specific convergence sublayer can include a function for associating a corresponding MAC service flow identifier (SFID) with a connection identifier (CID) after dividing SDUs of the external network.

Next, the MAC CPS layer provides main functions of MAC such as system access, bandwidth allocation, and connection setup and management, and receives data classified by specific MAC connection from various CSs through MAC SAP. At this time, quality of service (QoS) can be applied to data transmission and scheduling through a physical layer.

Also, a security sublayer can provide authentication, security key exchange, and encryption function. Hereinafter, a security service and a security sublayer will be described in brief.

The security service provides confidentiality and integrity for network data. Integrity means that the first message is transferred to counterpart without any change. Namely, integrity assures that the message is not changed randomly by the third party. Confidentiality means that information is only disclosed to those who are authorized. Namely, confidentiality perfectly protects data which are transmitted, so as to prevent those who are not authorized from accessing the data.

The security sublayer provides security, authentication, and confidentiality in a broadband wireless access network. The security sublayer can apply an encryption function to a medium access control protocol data unit (MAC PDU) transferred between a mobile station and a base station. Accordingly, the base station and the mobile station can provide robust protection capability against a service stealing attack of an illegal user. The base station prevents a data transmission service from being accessed without any authority by performing encryption of a service flow over the whole of a network.

The security sublayer controls distribution of key information from a base station to a mobile station by using a key management protocol of an authenticated client/server structure. At this time, it is possible to enhance a function of a basic security mechanism by adding digital certificate based mobile station authentication to the key management protocol.

If a mobile station does not provide a security function while mobile station basic capability negotiation is being performed, an authentication and key exchange process will be omitted. Even though a specific mobile station has been registered as a mobile station that does not support an authentication function, the base station can regard that authority of the mobile station has been verified. If the specific mobile station does not support a security function, since no service is provided to the corresponding mobile station, a key exchange or data encryption function is not performed.

The security sublayer includes an encapsulation protocol and a key management protocol (PKM). The encapsulation protocol is for security of packet data in a broadband wireless access network, and provides a method of applying an algorithm to cryptographic suites such as data encryption and data authentication algorithm and MAC PDU payload.

Cryptographic suites represent security association (SA) sets indicating an algorithm for data encryption, data authentication and TEK exchange. Namely, cryptographic suites represent a pair of data algorithm and data authentication algorithm.

The key management protocol provides a method of safely distributing key data from a base station to a mobile station. The base station and the mobile station can provide a method of safely distributing key data by using the key management protocol. If the key management protocol is used, key data can be shared between the mobile station and the base station, and the base station can control network access.

The security sublayer is connected with a physical layer through a physical service access point (PHY SAP). The PHY layer serves to transfer PDUs generated and encrypted in the MAC layer to a destination.

DETAILED DESCRIPTION OF THE INVENTION

Technical Problems

The embodiments of the present invention relate to methods and apparatuses applied to an IEEE 802.16m system (16m). The IEEE 802.16m system represents a system that uses the standard related to a wireless access system evolved from the aforementioned IEEE 802.16e system (16e). For parts which are not defined in the 16m system, refer to the standard of the 16e system.

In case of the 16e standard, CMAC key count (CMAC_KEY_COUNT) is used for handoff only so as to support TEK update during handoff. However, since the CMAC key count is defined for only a case where a mobile station performs handover, there is no consistency in TEK management. Also, since the 16m system is different from the 16e system in the method for generating a TEK, it is not efficient and proper that the TEK is generated and managed using CMAC_KEY_COUNT.

Also, the 16m standard for broadband wireless access system defines that a traffic encryption key (TEK) for protection of a unicast data service. At this time, generation of TEK currently described in the 16m is based on use of key count (for example, COUNTER_TEK). However, a detailed method for key count management to generate and/or update a TEK is not disclosed in the 16m standard.

For example, in the 16m system, the TEK can be locally generated and used by the mobile station and the base station. Data service flows through a 16m broadband wireless access network have a series of QoS parameters, and need encoding and decoding through a TEK.

However, if a network action, such as handoff (HO), network reentry (for example, network reentry due to connection loss and uncoordinated HO) or location update or network reentry in an idle mode, occurs, a method how to manage key count for generation and/or update of TEK is not defined clearly in the 16m standard. Namely, if the mobile station performs handoff or network reentry from a serving base station to a target base station, a part how to process a TEK count required for TEK update is not defined clearly in the 16m standard.

Also, if re-authentication or exhaustion of packet number (PN) space occurs, wherein the re-authentication or exhaustion of packet number space is an update factor of TEK, a method how to manage key count for TEK update is not defined clearly in the 16m standard.

Accordingly, the present invention is directed to a method and apparatus for key count management, which substantially obviates one or more problems due to limitations and disadvantages of the related art.

An object of the present invention is to provide a method for efficiently encrypting a data service.

Another object of the present invention is to provide a method and an apparatus for key count management for TEK update of a 16m system. Namely, another object of the present invention is to provide methods and apparatuses for key count management when network action, such as handoff, network reentry, location update in an idle mode or network reentry in an idle mode, occurs.

Still another object of the present invention is to provide a method for synchronizing TEK counts (or key counts) to flexibly update a TEK to be used by a mobile station during handoff and/or network reentry with a base station.

Further still another object of the present invention is to provide a method and an apparatus for generating and updating a TEK without applying high load to a network to support an improved data service.

Further still another object of the present invention is to provide methods and apparatuses for key count management if re-authorization or exhaustion of PN space, which is an update factor of TEK, occurs.

Further still another object of the present invention is to provide methods for synchronizing key counts between a mobile station and a base station for various network actions or TEK update, and apparatuses therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

To achieve these objects and other advantages and in accordance with the purpose of the invention, as embodied and broadly described herein, the present invention discloses a method for generating and updating a TEK in various communication statuses, and various methods and apparatuses for managing TEK counter (or key count) values. Also, the present invention discloses various methods and apparatuses for generating, maintaining, and managing a traffic key encryption key by using TEK counter (key count) values.

In a first embodiment of the present invention, a method for TEK count management to generate or update a traffic encryption key comprises transmitting a first message, which includes a first TEK count maintained by a mobile station, to a base station; receiving a second message, which includes a second TEK count, from the base station; and generating a TEK by using the second TEK count. In this case, the second TEK count is determined based on the first TEK count 'a', and the first TEK count 'a' and the second TEK count increase whenever handover or network reentry is performed, and can be reset whenever Nonce used for generation of TEK is updated.

In the first embodiment, if the first TEK count 'a' is greater than a third TEK count 'b' maintained by the base station, the first TEK count is determined as the second TEK count. If the first TEK count 'a' is smaller than or equal to the third TEK count 'b', the third TEK count 'b' is determined as the second TEK count.

In a second embodiment of the present invention, a method for TEK count management to generate or update a traffic encryption key comprises receiving a first message, which includes a first TEK count maintained by a mobile station, from the mobile station; transmitting a second message, which includes a second TEK count, from the base station to the mobile station; and generating a TEK in the base station by using the second TEK count. In this case, the second TEK count is determined based on the first TEK count, and the first TEK count and the second TEK count increase whenever handover or network reentry is performed, and can be reset whenever Nonce used for generation of TEK is updated.

In the second embodiment, the method further comprises comparing the first TEK count with a third TEK count maintained by the base station. At this time, if the first TEK count is greater than the third TEK count, the first TEK count is determined as the second TEK count. If the first TEK count is smaller than or equal to the third TEK count, the third TEK count is determined as the second TEK count.

In the first embodiment and the second embodiment, the method further comprises exchanging Nonce and security materials with the mobile station through a key agreement process.

In the first embodiment and the second embodiment, the first message is one of a ranging request message and a handover request message used during handover, and the second message is one of a ranging response message and a handover request message used during handover. Alternatively, the first message is a ranging request message used during network reentry, and the second message is a ranging response message used during network reentry.

In the first embodiment and the second embodiment, the step of generating a TEK includes generating a TEK in the base station by using one or more of a second TEK count, Nonce, an authentication key (AK), and security association identifier (SAID).

In the first embodiment and the second embodiment, the first message further includes one or more of a temporary identifier (ID), handover (HO) indication, location update request, paging controller TLV, and CMAC tuple, and the second message further includes one or more of location update response, Nonce, handover optimization information, and CMAC tuple.

In a third embodiment of the present invention, a method for key count management in a mobile station comprises performing an authentication process with a base station; exchanging key materials, which include Nonce, with the base station during a key agreement process; generating an authentication key (AK) by using the key materials during the key agreement process; setting two key counts having consecutive values each other; and generating two traffic encryption keys (TEKs) by using security association identifier (SAID) shared with the base station, the authentication key and the two key counts, respectively. In this case, it is preferable that two traffic encryption keys are managed per one security association.

In a fourth embodiment of the present invention, a method for key count management in a base station comprises performing an authentication process with a mobile station; exchanging key materials, which include Nonce, with the mobile station during a key agreement process; generating an authentication key (AK) by using the key materials during the key agreement process; setting two key counts having consecutive values each other; and generating two traffic encryption keys (TEKs) by using security association identifier (SAID) shared with the mobile station, the authentication key and the two key counts, respectively. In this case, it is preferable that two traffic encryption keys are managed per one security association.

In the third embodiment and the fourth embodiment, the two key counts are respectively reset in cases of during handover, network reentry, location update in an idle mode, and network reentry in an idle mode, respectively. Also, the network reentry is caused by uncoordinated handover or handover according to connection loss. Furthermore, the two TEKs are updated due to expiration of each TEK lifetime, respectively.

Meanwhile, if packet number (PN) space exhaustion occurs, only one TEK can be updated. In this case, only one key count can be reset in the mobile station and the base station.

In the third embodiment and the fourth embodiment, the two TEKs are generated using a Dot16KDF algorithm. In this case, the two key counts are reset if the AK is newly generated.

In a fifth embodiment of the present invention, a mobile station key count management comprises a transmission (Tx) module for transmitting a message to a base station; a reception (Rx) module for receiving a message from the base station; and a processor for managing key counts. In this case, the mobile station performs the steps of: performing an authentication process with a base station; exchanging key materials, which include Nonce, with the base station during a key agreement process; generating an authentication key (AK) by using the key materials during the key agreement process; setting two key counts having continuous values; and generating two traffic encryption keys (TEKs) by using security association identifier (SAID) shared with the base station, the authentication key and the two key counts, using the transmission module, the reception module and the processor. At this time, it is preferable that the two TEKs are managed per security association.

The two key counts are respectively reset in cases of during handover, network reentry, location update in an idle mode, and network reentry in an idle mode. Also, the network reentry is caused by uncoordinated handover or handover according to connection loss. Furthermore, the two TEKs are updated due to expiration of each TEK lifetime, respectively. At this time, the two TEKs are generated using a Dot16KDF algorithm.

Meanwhile, if packet number (PN) space exhaustion occurs, only one TEK can be updated. In this case, only one key count can be reset in the mobile station and the base station.

In the fifth embodiment, it is preferable that the two key counts are reset if the AK is newly generated.

It is to be understood that both the foregoing general description and the following detailed description of the present invention are exemplary and explanatory and are intended to provide further explanation of the invention as claimed.

Advantageous Effects

According to the embodiments of the present invention, the following advantages can be obtained.

First of all, if network actions, such as handoff, network reentry, location update in an idle mode, and network reentry in an idle mode, occur through the embodiments of the present invention, key counts (or TEK counts) can efficiently be managed.

Second, if re-authentication or PN space exhaustion occurs, key counts can efficiently be managed. In this case, the re-authentication or PN space exhaustion is an update factor of TEK.

Third, various network actions, methods for synchronizing key counts between a mobile station and a base station, and apparatuses for the methods can be provided.

Fourth, the mobile station and the base station can flexibly generate and update a TEK to provide a seamless service by defining the method for key count management described in the embodiments of the present invention.

Fifth, it is possible to uniformly generate and update a TEK in an advanced system (e.g., 16m system) by excluding use of CMAC key count used in the related art system (e.g., 16e system). Namely, although the related art system considers that CMAC key count is only used to update a TEK during handover, key counts (e.g., COUNTER_TEK) that can be used for generation and update of TEK are defined in the embodiments of the present invention, whereby the mobile station and the base station can manage the TEK uniformly.

Finally, in the embodiments of the present invention, as a method for generating and updating a TEK without applying high load to a network is provided, user capability can be enhanced to support an improved data service, and communication throughput can be prevented from being deteriorated due to generation of security information.

It is to be understood that the effects that can be obtained by the present invention are not limited to the aforementioned effects, and another effects, which are not described, will be apparent to those with ordinary skill in the art to which the present invention pertains, from the following detailed description of the present invention. Namely, effects which are not intended in the embodiments of the present invention can be derived from the embodiments of the present invention by those with ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
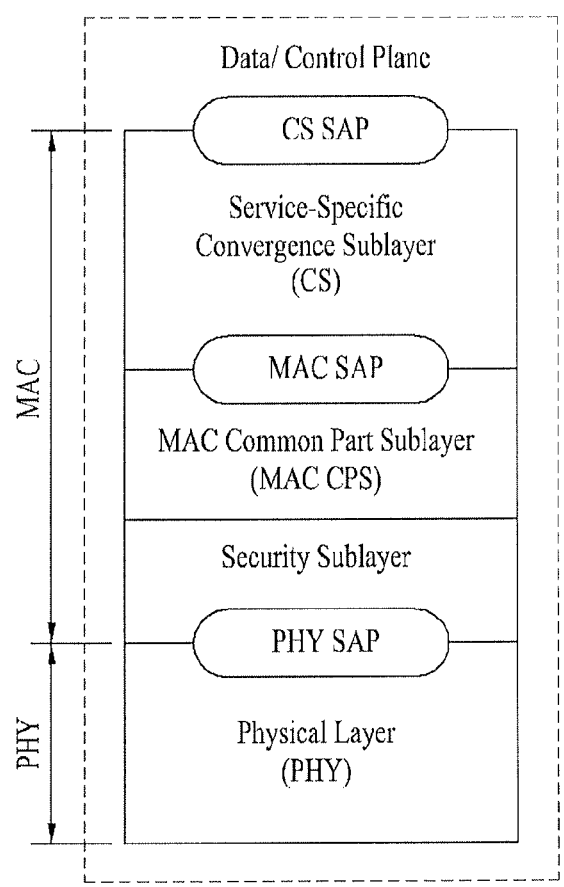
FIG. 1 is a diagram illustrating a protocol layer model defined in a wireless telecommunication system based on an IEEE 802.16e system which is generally used.

Reference will now be made in detail to the preferred embodiments of the present invention, examples of which are illustrated in the accompanying drawings. Wherever possible, the same reference numbers will be used throughout the drawings to refer to the same or like parts.

Hereinafter, the embodiments of the present invention disclose methods and apparatus for generating and managing a traffic encryption key count value in various communication statuses.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of the drawings, procedures or steps that may make the subject matter of the present invention obscure will be omitted, and procedures or steps that can be understood by the person with ordinary skill in the art will be omitted. However, it will be apparent that procedures or steps which are not illustrated can be predicted by those skilled in the art within an apparent range.

The embodiments of the present invention have been described based on the data transmission and reception between a base station and a mobile station. In this case, the base station means a terminal node (TN) of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes (NNs) along with the base station may be performed by the base station or network nodes other than the base station. The term of the base station may be replaced with one of terms such as a fixed station, Node B, eNode B (eNB), an advanced base station (ABS) and access point.

Also, the term of the mobile station may be replaced with one of terms such as a user equipment (UE), a subscriber station (SS), a mobile subscriber station (MSS), a mobile terminal (MS), an advanced mobile station (AMS) and a terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be a receiving side. Likewise, in a downlink, the mobile station could be a receiving side while the base station could be a transmitting side.

The embodiments of the present invention can be supported by standard documents disclosed in at least one of wireless access systems, i.e., IEEE 802.xx system, 3GPP system, 3GPP LTE system, and 3GPP2 system. Namely, among the embodiments of the present invention, apparent steps or parts which are not described can be described with reference to the above standard documents.

Also, all terminologies disclosed herein can be described by the above standard documents. Particularly, the embodiments of the present invention can be supported by one or more of standard documents of IEEE 802.16 system, i.e., P802.16e-2004, P802.16e-2005, P802.16-2009 and P802.16m.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Specific terminologies hereinafter used in the embodiments of the present invention are provided to assist understanding of the present invention, and various modifications can be made in the specific terminologies within the range that they do not depart from technical spirits of the present invention.

For example, uncoordinated handover (HO) can be used to refer to uncontrolled handover (HO). Also, a key count and a TEK count (COUNT_TEK) are used similar meaning which can be used as counter values used to generate and/or update a TEK.

Hereinafter, a method for generating and updating a TEK used during handover or network reentry will be described.

Unicast data service protection defined in the 16m system means cryptographic conversion of MPDUs transferred through connection between an advanced mobile station (AMS) and an advanced base station (ABS). Data protection between the mobile station and the base station serves as a traffic data encryption function that is one of functions of a security sublayer of a MAC layer.

Data encryption is applied to MAC PDU payload requested by selected ciphersuite. Generally, a key is required for data encryption, and a traffic encryption key (TEK) is defined as one of various keys in the 16m standard.

A base station in the 16e system generates a TEK and transmits the generated TEK to a mobile station, whereas a base station in the 16m system does not exchange a TEK with a mobile station through an air interface. Namely, in the 16m system, the base station and the mobile station can generate a TEK respectively.

Since the base station generates a TEK and transmits the generated TEK to the mobile station in the 16e system, several mobile stations can share one SA. However, in the 16m system, since the base station and the mobile station share security materials only for generating a TEK and respectively generate the TEK using the security materials, each mobile station has one SA.

In the embodiments, the base station and the mobile station maintain and manage synchronized TEK count for efficient update of the TEK. For example, the mobile station maintains and manages TEK count per TEK context, and the base station can maintain TEK count, which is synchronized with TEK count corresponding to the mobile station, for each TEK context.

The following Equation 1 illustrates one of methods for generating a TEK during handoff of the base station and the mobile station.

$$TEKi = Dot16KDF(KEK\_prime, CMAC\_KEY\_COUNT\_T|SAID|\text{"TEKi Generation"}, 128)$$ [Equation 1]

Referring to the Equation 1, the mobile station and the base station can generate a TEK by substituting a Key Encryption Key (KEK), CMAC key count, and security association Identifier (SAID) for a key derivation function (KDF), wherein the SAID identifies security association (SA) between the mobile station and the base station.

After PKMv2 authentication or re-authentication is successfully completed or a new PMK is set, the mobile station resets CMAC_KEY_COUNT and sets the same to '0'. This process is performed after SA TEK challenge message is received.

The following Equation 2 illustrates one of methods for generating a TEK in the 16m system.

$$TEK = Dot16KDF(AK, NONCE|KEY\_COUNT|SAID|AMS\ MAC\ Address|BSID|\text{"TEK"}, 128)$$ [Equation 2]

Referring to the Equation 2, the mobile station and the base station can respectively generate a TEK by substituting parameters, such as authentication key (AK), SAID, Nonce, Key_Count, base station identifier (BSID) and a MAC address of the mobile station (AMS MAC Address), for the key derivation function (KDF).

Figure 2:
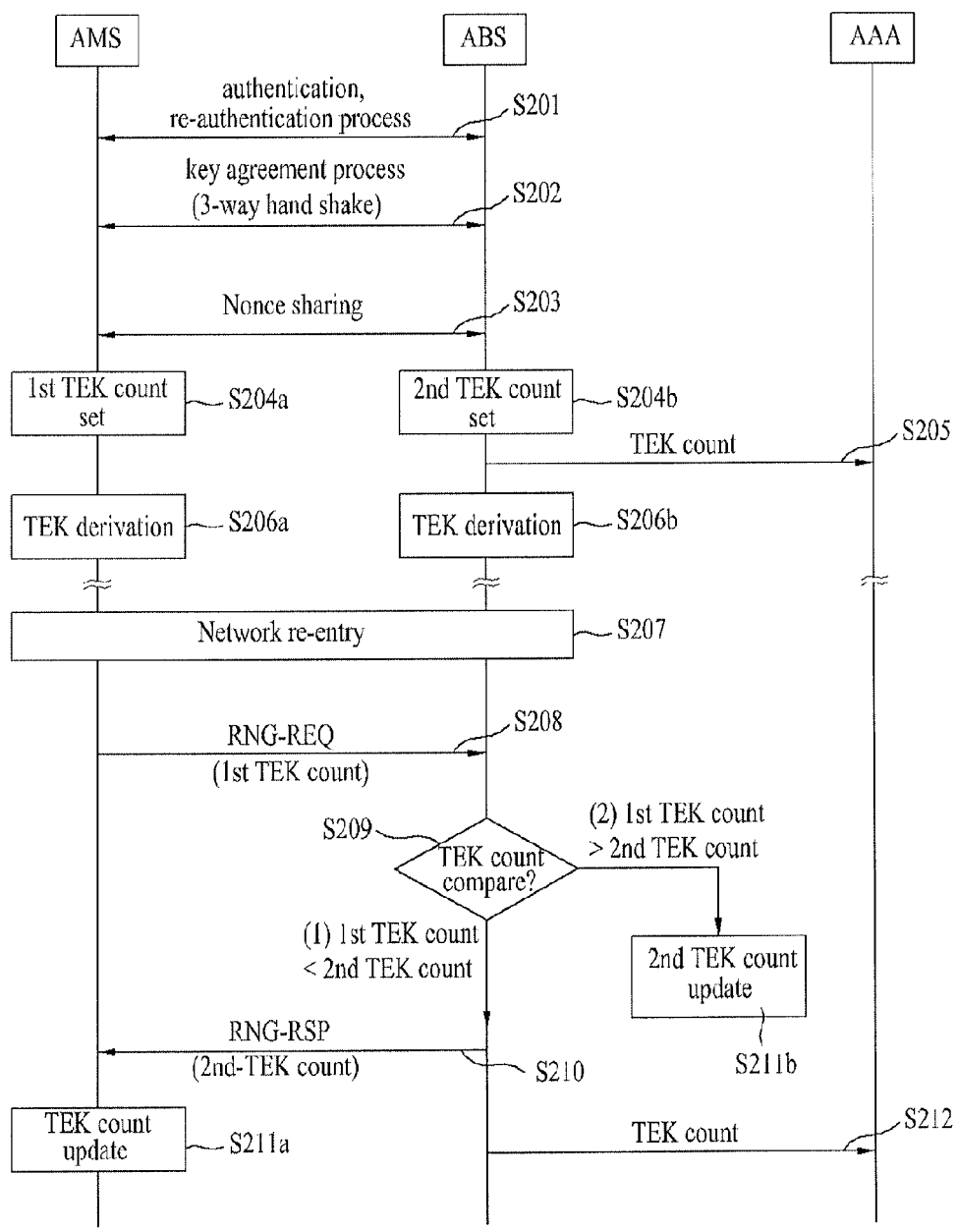
FIG. 2 is a diagram illustrating a method for TEK count management in accordance with the embodiment of the present invention.

FIG. 2 is a diagram illustrating a method for TEK count management in accordance with the embodiment of the present invention.

Referring to FIG. 2, the mobile station AMS and the base station ABS perform an authentication or re-authentication process (S201).

The mobile station and the base station can perform a key agreement process for negotiating an encryption key for data protection. As an example of the key agreement process, the mobile station and the base station can perform a 3-way handshake process (S202).

In step S202, the mobile station and the base station can share security contexts for generating a TEK, through the key agreement process (e.g. 3-way handshake). The 3-Way handshake process can be performed through three steps of SA-TEK challenge, SA-TEK request, and SA-TEK response. At this time, the security contexts can include AK context, KEK context, etc.

After the key agreement process is performed, the base station transmits Nonce for generating a TEK to the mobile station, so as to share Nonce (S203).

TEK count for generating and updating a TEK is reset by the mobile station and the base station and then is set to '0' after authentication or re-authentication is performed or a new PMK is set. The mobile station and the base station can set and maintain separate TEK count (1st TEK count, 2nd TEK count) per TEK context activated for each security association (SA). Accordingly, the mobile station and the base station can uniquely maintain TEK count per SA when a TEK is generated. Namely, the TEK count should be maintained differently per SA (S204a, S204b).

The base station can transfer the set TEK count value to an authentication entity (AAA) server (S205).

The mobile station and the base station can generate a TEK using Nonce, TEK count and other security context based on the equation 1 or equation 2 (S206a, S206b).

The mobile station may reentry a network while data communication is being performed. However, in this case, network reentry does not mean network reentry by a mobile station in an idle mode but means network reentry of a connected mode caused by network action such as connection loss or uncoordinated handover (HO) (S207).

The TEK count maintained and managed by the mobile station and the base station increases whenever handover or network reentry occurs, and can be reset whenever Nonce used to generate a TEK is updated. In this case, the size of the TEK count may not be great. This is because that, if network reentry is performed, new Nonce is generated by the base station and then allocated to the mobile station, whereby the TEK count is reset.

In other words, the TEK count increases whenever handover or network reentry occurs, whereby the same TEK is prevented from being generated. This can equally be applied to a case where the mobile station moves from the serving base station to the target base station and then returns to the serving base station.

In the embodiments of the present invention, the TEK count is defined as a value reset whenever a TEK is generated. This can be applied to a general TEK update status where packet number (PN) size expires.

The mobile station can transmit a ranging request (RNG-REQ) message to the base station during handover or network reentry, wherein the ranging request (RNG-REQ) message includes TEK count TLV (e.g., 1st TEK count) representing information of TEK count (S208).

In step S208, the ranging request message may further include one or more of temporary ID of the mobile station, handover (HO) indication, and CMAC Tuple.

The base station can identify a TEK count value (1st TEK count) of the mobile station through TEK count information (for example, TEK count TLV) included in the RNG-REQ message. Accordingly, the base station can compare the received TEK count value with a TEK count value (2nd TEK count) maintained by the base station (S209).

In step S209, if the TEK count (1st TEK count) maintained by the mobile station is smaller than the TEK count (2nd TEK count) maintained by the base station, the base station can notify the mobile station of its TEK count value (2nd TEK count) through a ranging response (RNG-RSP) message. Namely, the base station can command the mobile station to update the TEK count value of the mobile station to the TEK count value maintained by the base station (S210).

In step S210, the ranging response message includes one or more of CMAC tuple, Nonce, TEK count TLV and handover optimization information for network entry.

The mobile station which has received the ranging response message including the TEK count value (2nd TEK count) can update its TEK count (1$^{st}$ TEK count) to the TEK count (2nd TEK count) of the base station (S211a).

In addition, in step S209, if the TEK count (1$^{st}$ TEK count) maintained by the mobile station is lager than the TEK count (2$^{nd}$ TEK count) maintained by the base station, the base station can update its TEK count with the 1$^{st}$ TEK count (S211b).

The steps of S211a and S211b are procedure synchronizing the TEK counts between the AMS and the ABS during handover (HO) and network re-entry.

Meanwhile, in step S209, if the TEK count of the mobile station is the same as that of the base station, the base station transmits the ranging response (RNG-RSP) message, which includes the corresponding TEK count (2nd TEK count), to the mobile station, and the mobile station and the base station can generate a TEK using the same TEK count (not shown).

When the mobile station completes handoff or network reentry, the base station notifies an authentication server (e.g., authenticator) of it, and transmits its TEK count value and/or the TEK count value of the mobile station to the authentication server (212).

If network reentry occurs as illustrated in FIG. 2, the TEK count information (TEK count TLV) maintained by the mobile station and the base station can be included in the ranging request message and the ranging response message. This specifies the TEK count values respectively maintained by the mobile station and the base station, and is used for synchronization of TEK counts for generating a TEK to be shared between the mobile station and the base station.

Figure 3:
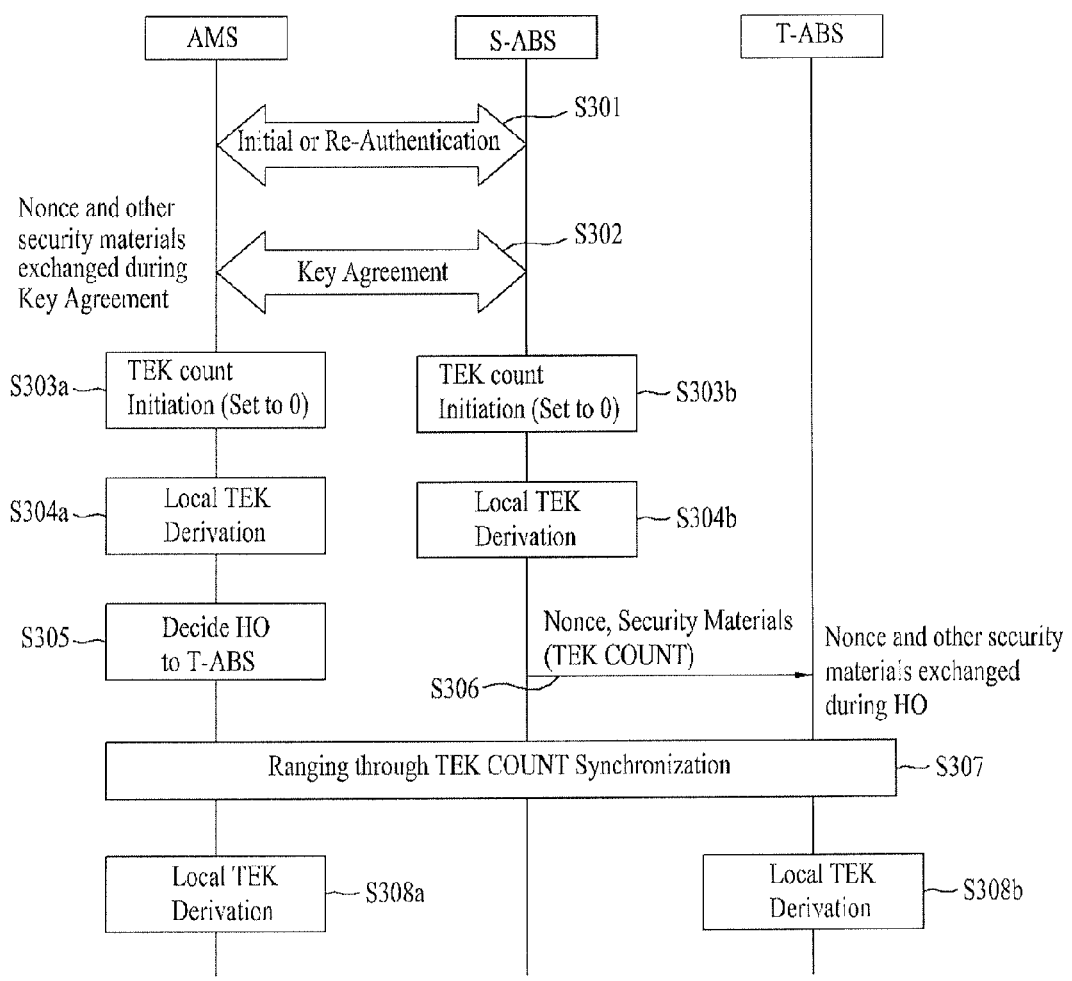
FIG. 3 is a diagram illustrating one of methods for updating TEK count during a handover process in accordance with one embodiment of the present invention.

FIG. 3 is a diagram illustrating one of methods for updating TEK count during a handover process in accordance with one embodiment of the present invention.

Referring to FIG. 3, the mobile station AMS can perform initial authentication or re-authentication together with a serving base station (S-ABS) (S301).

The mobile station and the serving base station can exchange Nonce and other security materials with each other through a key agreement process. At this time, the security materials can include CMAC tuple, an authentication key (AK), a MAC address of the mobile station (AMS MAC address), an advanced base station identifier (ABS ID), and SAID (S302).

The mobile station and the serving base station can reset the TEK count according to TEK context. In this case, the TEK count is set to '0' at the AMS and the S-ABS, respectively (S303a, S303b).

Also, the mobile station and the serving base station can generate a TEK using Nonce, TEK count, and other security materials (S304a, S304b).

As the mobile station moves a cell region of the serving base station, it can determine handover to a target base station (T-ABS) (S305).

In step S305, although the mobile station has determined handover to the target base station, the serving base station may determine handover depending on a communication status or user's request.

If it is determined that handover should be performed, the serving base station can transfer a TEK count set as a result of authentication or re-authentication, Nonce required to generate a TEK, and other security materials (e.g., security contexts) to the target base station (S306).

In FIG. 3, the mobile station and the target base station can update the TEK before completing the handover process. The target base station can synchronize the TEK count with that of the mobile station through the ranging process. Namely, the mobile station and the target base station can identify synchronization of the TEK counts between the mobile station and the target base station and synchronize the TEK counts through exchange of the ranging request (RNG-REQ) message and the ranging response (RNG-RSP) message (S307).

At this time, the step S307 can refer to the description of the steps S208 to S211 of FIG. 2.

The mobile station and the target base station (t-ABS) can resume communication after respectively generating the TEKs using the synchronized TEK counts (S308a, 308b).

Figure 4:
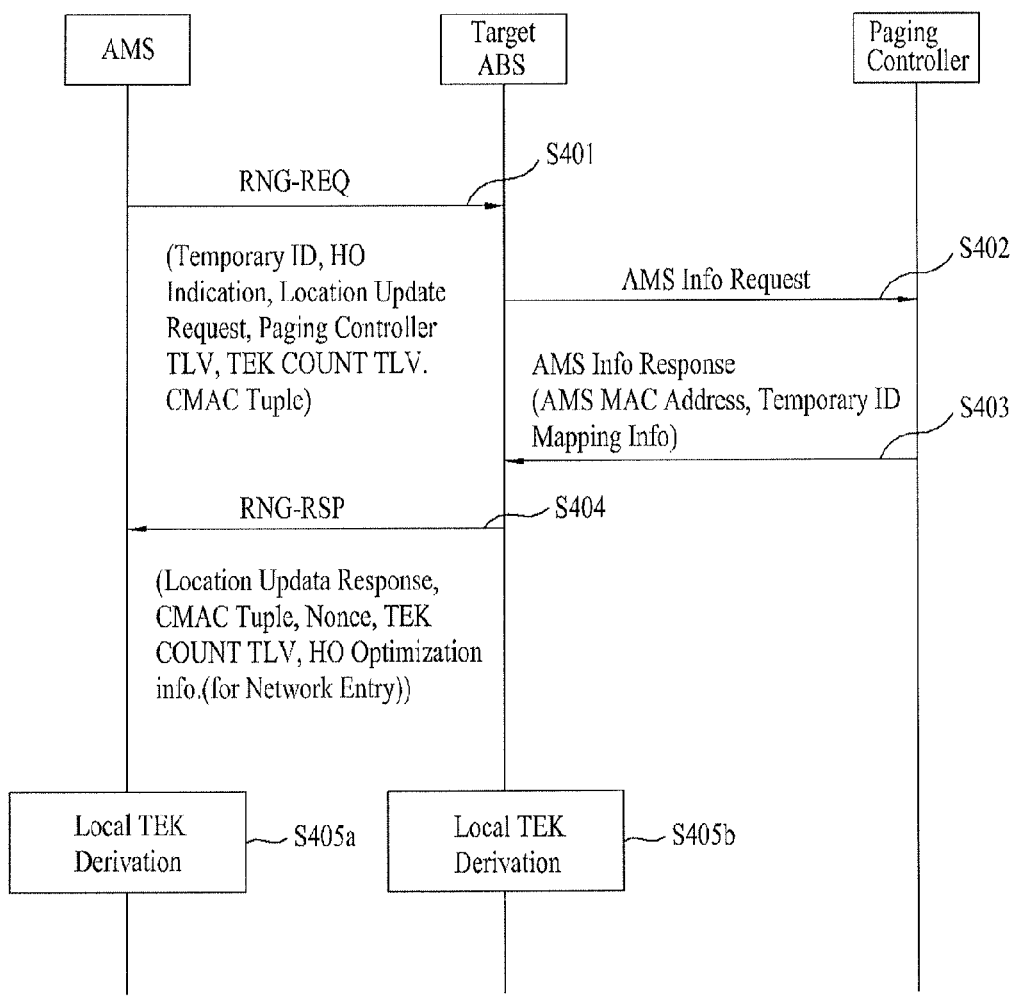
FIG. 4 is a diagram illustrating a method for updating TEK count during a ranging process of a mobile station in an idle mode in accordance with the embodiment of the present invention.

FIG. 4 is a diagram illustrating a method for updating TEK count during a ranging process of a mobile station in an idle mode in accordance with the embodiment of the present invention.

FIG. 4 illustrates a method for TEK count management during network reentry on a connected mode (connection loss, uncoordinated HO). The mobile station AMS and the target base station T-ABS respectively retain parameters for generating a TEK.

In FIG. 4, it is assumed that the mobile station is in an idle mode. Namely, as the mobile station in the idle mode moves to a neighboring base station of the serving base station, the AMS in the idle mode can perform location update with the T-ABS. In other words, the mobile station can maintain and update TEK count through a location update process with the T-ABS.

Accordingly, the mobile station and the target base station can identify AK by exchanging the ranging request message and the ranging response message with each other during the location update process, and can also identify whether the TEK counts have been synchronized.

In other words, it is not required that Nonce and other security materials (e.g., security context) are newly transmitted from the target base station to the mobile station. Also, the TEK counts are synchronized at increased values and then can be used for TEK update.

Referring to FIG. 4, the mobile station can transmit the ranging request message, which includes one or more of temporary ID, handover (HO) indication, location update request, paging controller TLV, TEK count TLV, and CMAC tuple, to the target base station during network reentry in the idle mode (S401).

At this time, the mobile station can transmit the ranging request message, which includes temporary ID instead of the MAC address of the mobile station, to the target base station to protect location privacy of the mobile station. Also, the TEK count TLV value represents the TEK count value currently maintained by the mobile station.

The target base station which has received the ranging request message can transmit an advanced mobile station information request (AMS info request) message to a paging controller to request information of the advance mobile station AMS (S402).

The paging controller can transmit an AMS information response message to the target base station, wherein the AMS information response message includes the MAC address of the mobile station and temporary ID mapping information (S403).

In the embodiment of the present invention, it is assumed that the paging controller retains information related with the mobile station AMS acquired at the time of the AMS had entered the idle mode.

The temporary ID mapping information represents mapping information between the MAC address of the mobile station and temporary ID. Namely, the target base station can identify the mobile station using the temporary ID mapping information.

The target base station can transmit the ranging response message to the mobile station in response to the ranging request message. In this case, the ranging response message includes one or more of location update response, CMAC tuple, Nonce, TEK count TLV, and handover optimization information (HO Optimization info) indicating a process that can be skipped during network entry (S404).

The mobile station and the target base station can respectively generate a TEK using the synchronized TEK counts, Nonce, and other security materials (S405a, S405b).

In FIG. 4, generation and update of the TEK can be performed using the following Equation 3.

$$(Old,New)TEK=Dot16KDF(AK,(Old,New) Nonce|SAID|TEK\ COUNT|"TEK",128)$$ [Equation 3]

Referring to FIG. 4, the mobile station and the target base station can respectively generate a TEK by substituting AK, Nonce, SAID, and TEK count value for a key derivation function as defined equation 3. However, in step S405a and S405b, the mobile station AMS and the base station T-ABS can generate a TEK by using the method of generating a TEK, as described in the Equation 2, in addition to the Equation 3.

Figure 5:
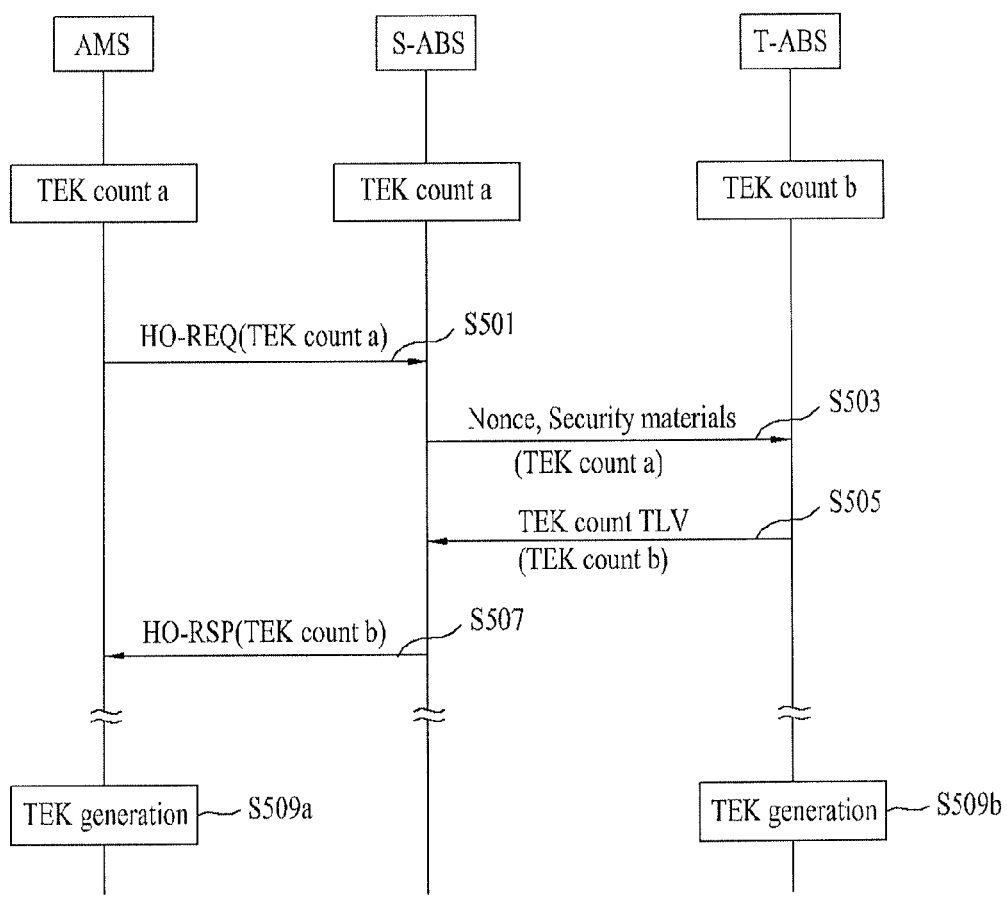
FIG. 5 is a diagram illustrating a method for updating TEK count in a mobile station and a target base station during a handover process in accordance with the embodiment of the present invention.

FIG. 5 is a diagram illustrating a method for updating a TEK count in a mobile station and a target base station during a handover process in accordance with the embodiment of the present invention.

Referring to FIG. 5, the mobile station AMS, the serving base station S-ABS, and the target base station T-ABS can respectively maintain and manage the TEK counts. At this time, it is assumed that the TEK counts of the mobile station and the serving base station are 'a', and the TEK count of the target base station is 'b'.

When the mobile station intends to move from the cell region of the serving base station to the cell region of the target base station, it can transmit a handover request message to the serving base station. At this time, the handover request message can include a TEK count value 'a' of the mobile station (S501).

The serving base station which has received the handover request message can transfer Nonce and security materials to the target base station through a backbone network. In this case, the security materials can include one or more of TEK count 'a' of the mobile station, TEK context, CMAC tuple, authentication key (AK), MAC address of the mobile station (AMS MAC address), advanced base station identifier (ABS ID), and SAID (S503).

The target base station can compare its TEK count value 'b' with the TEK count value 'a' of the mobile station. If 'a' is greater than 'b', the target base station updates the TEK count to the value 'a'. If 'a' is smaller than 'b', the target base station transmits the value 'b' to the serving base station so that the mobile station updates the TEK count to 'b'. Also, if 'a' is equal to 'b', the target base station can directly generate a TEK by using Nonce received in step S503 and the value 'b'. In FIG. 5, it is assumed that the value 'b' is greater than the value 'a'.

In other words, through the aforementioned comparison process, the target base station and the mobile station can synchronize the TEK counts before completing handover. Accordingly, the target base station can transfer the updated TEK count value 'b' through the backbone network (S505).

The serving base station can transmit the TEK count value 'b' of the target base station to the mobile station through the handover response message (S507).

The mobile station and the target base station can respectively generate a TEK by using the updated TEK count value 'b'. The mobile station and the target base station can generate a TEK by using either the Equation 2 or the Equation 3 (S509a, S509b).

The mobile station can be provided with a seamless service with confidentiality even during handover or network reentry. For example, as the serving base station transfer the TEK count required to generate a TEK to the target base station during handoff, the mobile station and the target base station can update the same TEK by maintaining the synchronized TEK counts. Also, it is possible to identify whether the TEK counts have been synchronized, through a location update ranging process or a handover ranging process.

The mobile station and the target base station can generate and update a TEK quickly through the aforementioned steps, whereby communication throughput can be prevented from being deteriorated.

Hereinafter, as another embodiment of the present invention, methods of synchronizing TEK counts during handover will be described. However, the following embodiments will be described in more detail based on the methods described with reference to FIG. 2 to FIG. 5.

In the embodiments of the present invention, the TEK count represents a value that can be maintained uniquely per SA when a TEK is generated. Also, the TEK count can be defined as an initial value when a TEK is updated. The mobile station and the base station can update the TEK (1) when the mobile station performs handover, (2) when the mobile station reenters the network, (3) when a TEK lifetime expires, and (4) when a packet number (PN) size expires.

In the embodiments of the present invention, the TEK count increases by '1' whenever the mobile station performs handover or reenters the network, whereby each of the mobile station and the base station may not generate the same TEK compared with the previous TEK.

Also, it is preferable that the mobile station and the base station maintain different TEK counts for TEK contexts activated for each security association (SA). Namely, the mobile station and the base station maintain the TEK counts differently per SA.

The base station can initiate the TEK count and set the reset TEK count to '0' at the time when the base station shares Nonce with the mobile station and authentication or re-authentication is successfully completed or new AK context is set after key agreement. The base station can maintain separate TEK count per TEK context activated for each SA. Namely, the TEK count should be maintained at different values per SA.

Figure 6:
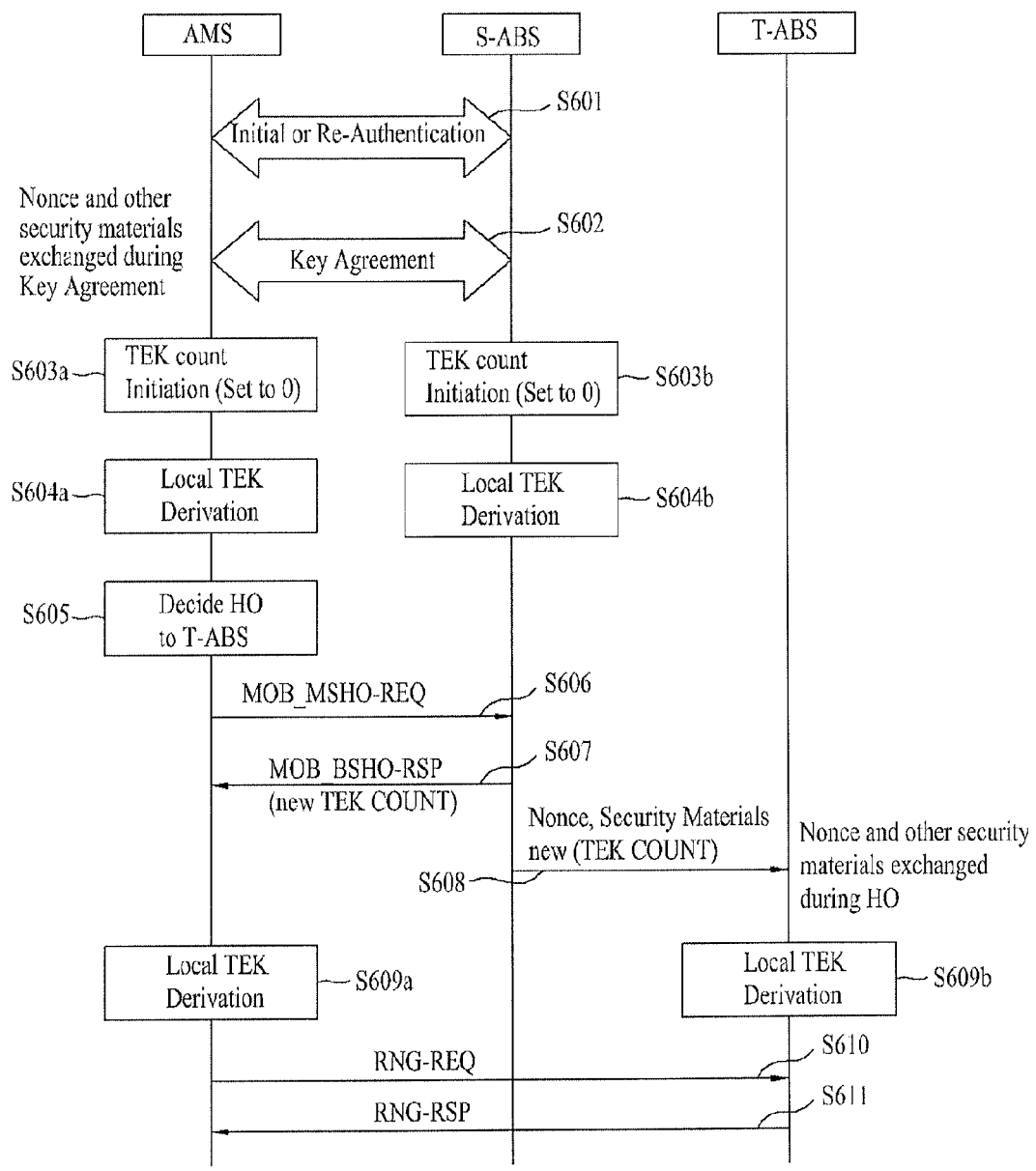
FIG. 6 is a diagram illustrating a method for synchronizing TEK count during a handover process if a mobile station determines handover in accordance with the embodiment of the present invention.

FIG. 6 is a diagram illustrating a method for synchronizing TEK count during a handover process if a mobile station determines handover in accordance with the embodiment of the present invention.

Since the description of steps S601 to S605 of FIG. 6 is the same as that of steps S301 to S305 of FIG. 3, it will be replaced with the description of FIG. 3.

The mobile station AMS can transmit a handover request (MOB_MSHO-REQ) message to the serving base station S-ABS (S606).

The serving base station can recognize that the mobile station will perform handover by receiving the handover request message from the mobile station. Accordingly, the base station can generate a new TEK count by increasing its TEK count by 1, and can transmit the handover response (MOB_BSHO-RSP) message to the mobile station, wherein the handover response message includes the new TEK count (S607).

In another aspect of FIG. 6, since the mobile station has decided whether to perform handover, the mobile station can transmit the handover request message to the serving base station, wherein the handover request message includes new TEK count. Namely, the mobile station can generate a new TEK count by increasing its TEK count by '1', and can transmit the new TEK count to the serving base station, whereby the serving base station can update the TEK count.

In this respect, in the steps S606 to S607, the MOB_MSHO-REQ message or the MOB_BSHO-RSP message can include information for transferring new TEK count, wherein the information can be included in the handover message in the form of additional field, parameter or TLV.

Referring to FIG. 6 again, the serving base station can transfer new TEK count, Nonce required for TEK generation, and other security parameters to the target base station through the backbone network. In this case, the security materials can include CMAC tuple, authentication key (AK), MAC address of the mobile station (AMS MAC address), advanced base station identifier (ABS ID), and SAID (S608).

The mobile station and the target base station can manage the synchronized TEK counts through the steps S606 to S608. Namely, the mobile station can explicitly synchronize the TEK counts required to update the TEK to be used by the target base station. Accordingly, the mobile station and the target base station can generate and use the same TEK (S609a, S609b).

Since the mobile station can generate the same TEK as that of the target base station before accessing (i.e., ranging process) the target base station, service continuity is not deteriorated. Accordingly, the mobile station and the target base station can perform the ranging process by using the generated TEK (S610, S611).

Figure 7:
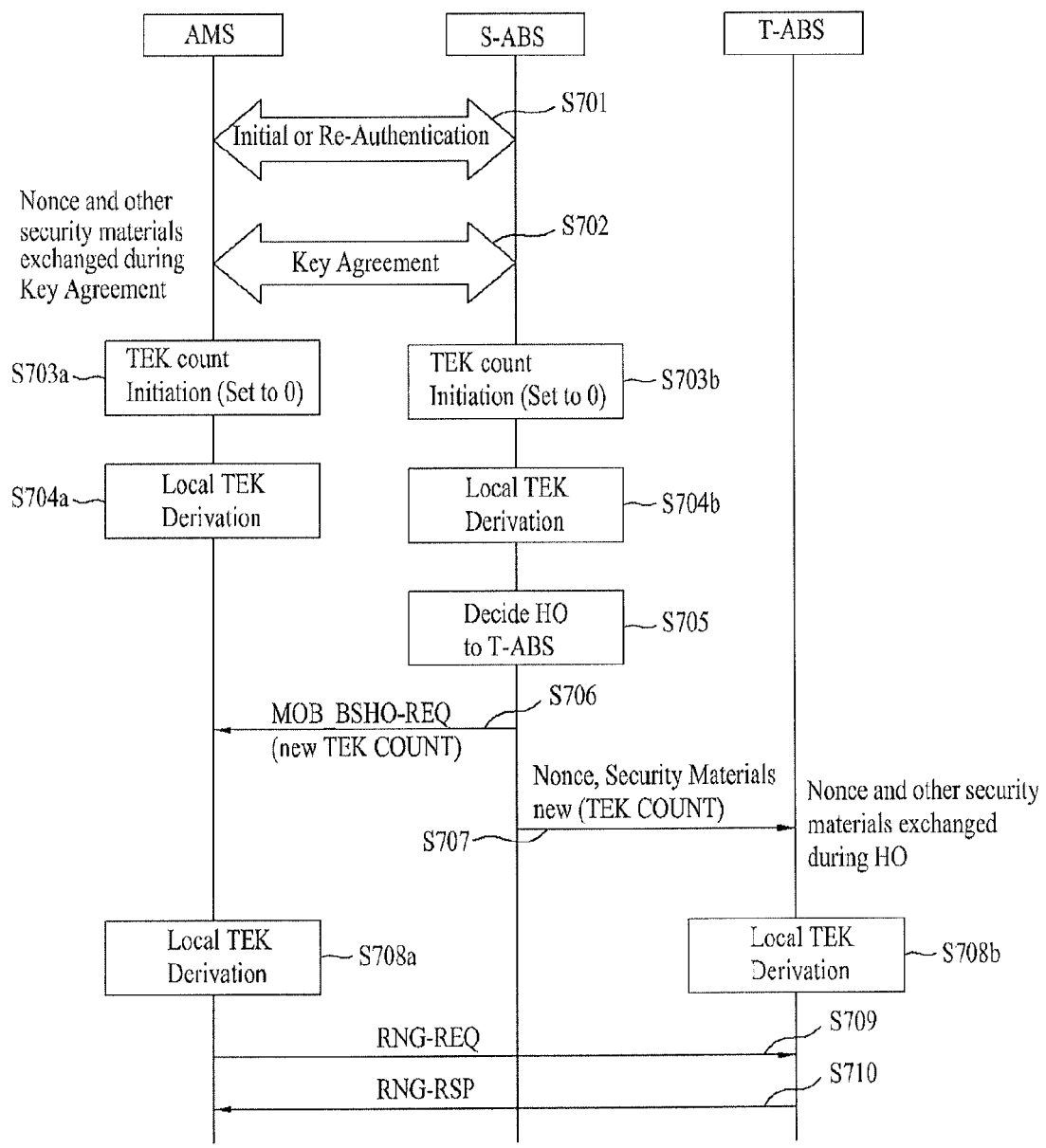
FIG. 7 is a diagram illustrating a method for synchronizing TEK count during a handover process if a serving base station determines handover in accordance with the embodiment of the present invention.

FIG. 7 is a diagram illustrating a method for synchronizing TEK count during a handover process if a serving base station determines handover in accordance with the embodiment of the present invention.

The description of FIG. 7 is almost similar to the description of FIG. 6. Accordingly, the repeated description will refer to FIG. 6. Hereinafter, only parts different from FIG. 6 will be described.

Referring to FIG. 7, the serving base station S-ABS can determine handover of the mobile station AMS (S705).

In this case, since handover has occurred, the serving base station S-ABS can generate new TEK count by increasing its TEK count by 1. Accordingly, the serving base station can transmit the handover request (MOB_BSHO-REQ) message, which includes the new TEK count, to the mobile station (S706).

Also, the serving base station can transfer the new TEK count, Nonce, and security materials to the target base station through the backbone network, wherein the mobile station will perform handover at the target base station. In this case, the security materials can include CMAC tuple, authentication key (AK), MAC address of the mobile station (AMS MAC address), advanced base station identifier (ABS ID), and SAID (S707).

Through the steps S706 and S707, the mobile station and the target base station can generate and maintain the same TEK before handover is completed. Accordingly, the mobile station can be provided with a service without seamlessness.

Figure 8:
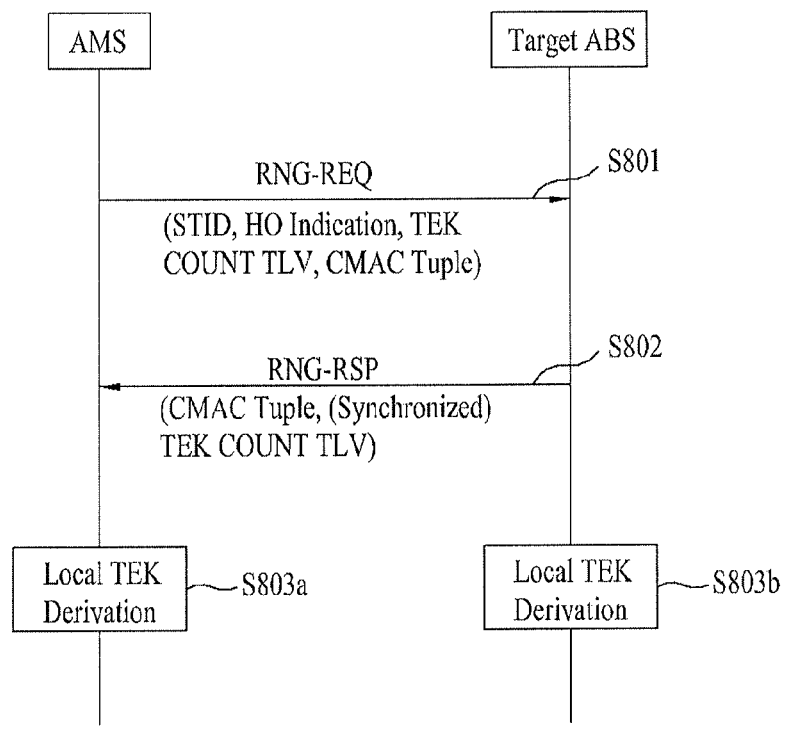
FIG. 8 is a diagram illustrating a method for synchronizing TEK counts between a mobile station and a target base station through a ranging process in accordance with the embodiment of the present invention.

FIG. 8 is a diagram illustrating a method for synchronizing TEK counts between a mobile station and a target base station through a ranging process in accordance with the embodiment of the present invention.

The mobile station and the target base station can synchronize TEK counts through exchange of the ranging message during the network reentry process when network reentry caused by connection loss or uncoordinated handover (HO) is performed.

For example, since the mobile station and the target base station respectively retain security parameters (e.g., security materials) for TEK generation, the target base station can identify the authentication key (AK) through exchange of the ranging messages (RNG-REQ and RNG-RSP) during network reentry, and can identify whether the TEK counts have been synchronized.

At this time, since Nonce and other security parameters are already shared between the mobile station and the target base station, the target base station may not transfer them to the mobile station again. Also, since the TEK counts of the mobile station and the target base station are synchronized by the increased value, they can be used for TEK update.

Referring to FIG. 8, the mobile station can transmit the RNG-REQ message, which includes station identifier (STID), handover indication field, TEK count TLV indicating TEK count 'a' of the mobile station, and CMAC tuple field, to the target base station (S801).

At this time, the target base station can compare its TEK count value 'b' with the TEK count value 'a' of the mobile station, which is indicated by the TEK count TLV included in the RNG-REQ message. If the TEK count value 'a' of the mobile station is equal to the TEK count value 'b' of the target base station, the mobile station and the target base station can use the TEK which is previously generated.

However, if the TEK counts managed by the mobile station and the target base station are different from each other, it is preferable that the mobile station and/or the target base station updates the TEK count to generate a new TEK count.

For example, if the TEK count 'a' of the mobile station is greater than the TEK count 'b' of the target base station, the target base station updates its TEK count to the TEK count 'a' of the mobile station. If the TEK count 'a' of the mobile station is smaller than the TEK count 'b' of the target base station, the mobile station resets the TEK count 'a' in accordance with instructions of the target base station or updates its TEK count to the TEK count 'b' of the target base station.

In the embodiments of the present invention, it is assumed that the TEK count of the mobile station is updated to the TEK count of the target base station. Accordingly, the target base station can transmit the ranging response (RNG-RSP) message, which includes the CMAC tuple and the TEK count TLV 'b' synchronized through the comparison step, to the mobile station (S802).

The mobile station and the target base station can generate the same TEK by using the TEK count 'b' which is newly synchronized. At this time, the TEK can be generated using the method for generating a TEK as described in the Equation 2 or 3 (S803a, S803b).

In the embodiments of the present invention, as there are provided methods for TEK count management to support flexible TEK update for a mobile station which performs handoff and network reentry in a connected mode, a seamless service can be provided to the mobile station.

For example, as the serving base station transfers the increased value of the TEK count required for TEK generation to the target base station during handoff, the mobile station and the target base station can maintain the synchronized TEK counts and update the same TEK.

Also, the mobile station and the base station can identify whether the TEK counts have been synchronized, through the general ranging process.

Furthermore, the mobile station and the target base station can identify whether the TEK counts have been synchronized, through exchange of the ranging messages during network reentry, and can update the same TEK after setting the TEK counts to the increased values of the TEK counts respectively maintained by the mobile station and the target base station.

Key Count Initiation

In the embodiments of the present invention, key counts are preferably initiated after initial authentication or re-authentication is completed. Also, it is preferable that two TEKs are generated per security association (SA). Accordingly, if key counts are initiated, key count values can be set to two consecutive values of '0' and '1'. Namely, in the embodiments of the present invention, which will be described hereinafter, since two TEKs should be generated when the mobile station AMS performs initial authentication for the base station ABS, the key count values required for TEK generation are '0' and '1'.

At this time, each key count value is used to generate a separate TEK. For example, the key count is initiated whenever an authentication key (AK) is set between the AMS and the ABS. Also, the key count is maintained per security association (SA) for TEK generation and update. The key count can allow the mobile station and/or the base station not to use a key (for example, TEK) the same as a previous key after handover (HO), network reentry caused by uncoordinated handover, network reentry caused by connection loss, or location update and network reentry in an idle mode.

Furthermore, the key count can allow the mobile station and/or the base station to use a TEK different from a previous key even during TEK update caused by PN space exhaustion or expiration of TEK lifetime. Namely, the key count assures freshness of TEK. In this respect, a TEK period (e.g., lifetime) can depend on the size of key count. For example, if the key count reaches a predetermined maximum value, it is reset to an initial value of '0' or '1', whereby the TEK can be updated.

Reset and increment conditions of the key count for TEK update, as suggested in the embodiments of the present invention, are as follows:

1) handover;
2) network reentry caused by uncoordinated handover;
3) network reentry in a connected mode, caused by connection loss;
4) TEK update caused by expiration of TEK lifetime; and
5) TEK update caused by PN space exhaustion.

The conditions 1) to 4) are key count reset conditions, and 5) is a key count increment condition. Preferably, the mobile station AMS and the base station ABS maintain a separate key for each TEK activated for each SA. At this time, a method for generating a TEK by considering use of the key count is illustrated in the following Equation 4. The TEK may be generated and/or updated using the methods for generating a TEK as described in the Equations 1 to 3.

$$TEK=Dot16KDF(AK,SAID|Key Count|"TEK",128) \quad \text{[Equation 4]}$$

A Dot16KDF algorithm used in the Equation 4 represents configuration of a counter mode encryption (CTR) mode that generates random key materials from source key materials. Referring to the Equation 4, in the embodiments of the present invention, the TEK can be generated by substituting authentication key (AK), security association identifier (SAID) and key count for the Dot16KDF algorithm.

In the embodiments of the present invention, the key count can be used as a value 'i' of a TEK counter (COUNTER_TEK). Namely, the key count is a counter value used to generate a separate TEK for the same security association identifier (SAID). The key count can be varied whenever a new TEK is required while the same AK is valid. Also, the key count can be reset whenever a new AK is generated. The mobile station and/or the base station can always maintain two TEKs per security association. At this time, the two TEKs can be obtained from continuous key count values.

In the embodiments of the present invention, a new TEK is generated as follows:

1) initial network entry;
2) handover reentry;
3) location update;
4) network reentry from an idle mode;
5) TEK PN space exhaustion;
6) expiration of TEK lifetime; and
7) directly after re-authentication or PMK update.

The above conditions for generating a new TEK other than expiration of TEK lifetime occur when a new AK is generated. In this case, TEK lifetime is the same as AK lifetime.

In case of the conditions 1) to 4) for generating a new TEK, an encryption key sequence (EKS) value for each TEK is the same as a key count value COUNTER_TEK used to generate a TEK. Also, in case of the condition 5), the key count value can be increased by 1 whenever a new TEK is generated by the base station and/or the mobile station.

The conditions for resetting the key count value have been described as above. The aforementioned method for key count reset can be applied to the embodiments of the present invention, which will be described below.

Method for Key Count Management During Handover and Network Reentry

Figure 9:
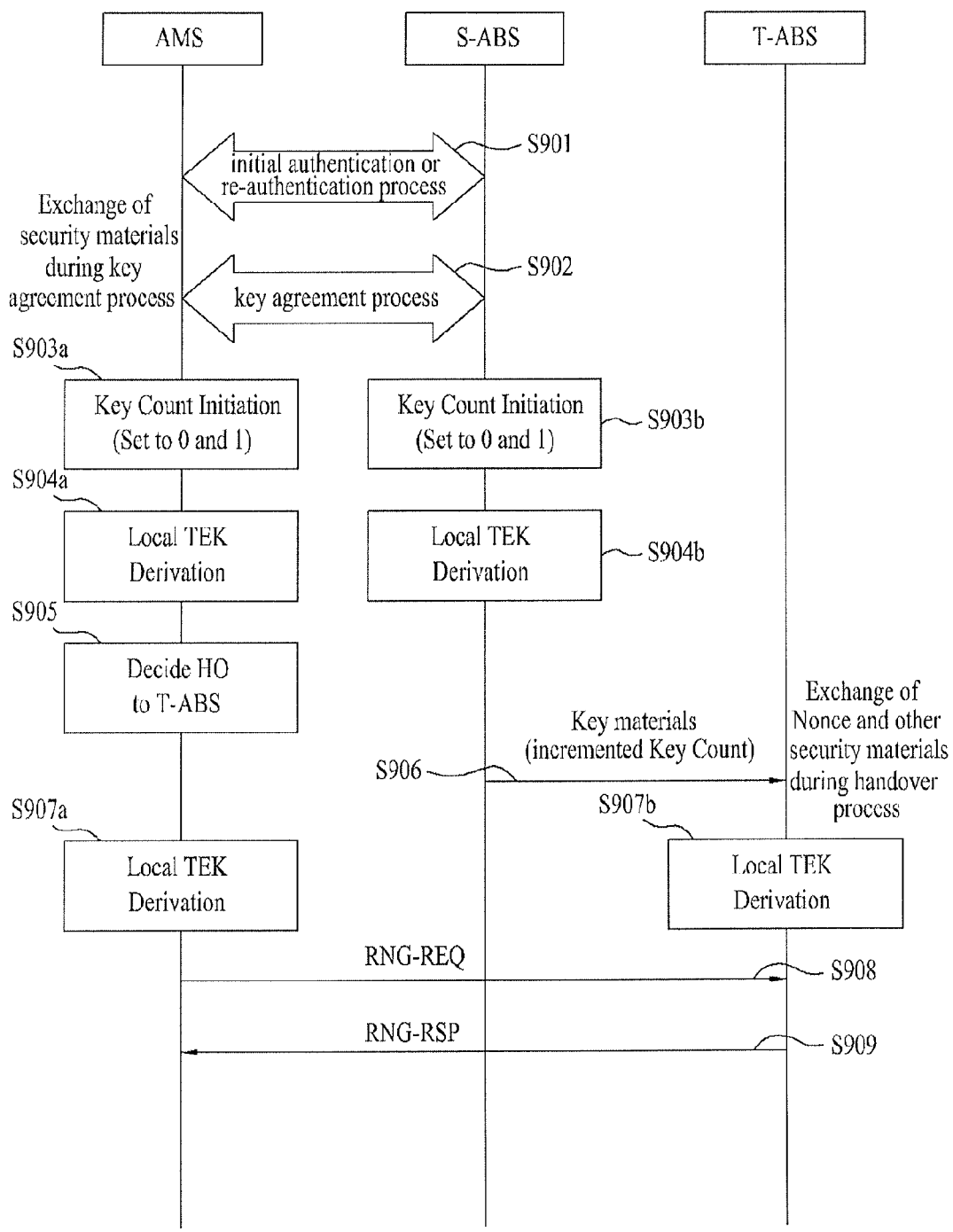
FIG. 9 is a diagram illustrating a method for key count management in a handover status in accordance with the embodiment of the present invention.

FIG. 9 is a diagram illustrating a method for key count management in a handover status in accordance with the embodiment of the present invention.

The mobile station AMS performs initial authentication or re-authentication procedure with the serving base station S-ABS (S901), and exchanges security materials with the serving base station through a key agreement process (S902).

The mobile station and the base station respectively initiated two key counts to '0' and '1' (S903a, S903b), and generate two TEKs using the method for generating a TEK as described in the Equation 4 (S904a, S904b).

As a communication status is varied, the mobile station determines whether to perform handover to the target base station by performing a handover process with the serving base station (S905).

In this case, the serving base station can transfer key materials negotiated with the mobile station to the neighbor base station which is a handover target base station. At this time, each of the key count value included in the key materials increases by 1 (or predetermined size) due to handover. Alternatively, since the AK has been newly generated, the key count value can be reset to '0' and '1', respectively. This is to allow the serving base station and the target base station not to have the same TEK after handover (S906).

The mobile station and the target base station can additionally exchange Nonce and other security materials with each other during the handover process and respectively generate a TEK based on their key materials. At this time, the mobile station and the target base station can generate a TEK using the increased key count value as defined in the equation 4 (S907a, S907b).

After moving to the target base station, the mobile station can synchronize with the target base station through the ranging process (exchange of RNG-REQ/RNG-RSP) and acquire other information related to the target base station (S908, S909).

Figure 10:
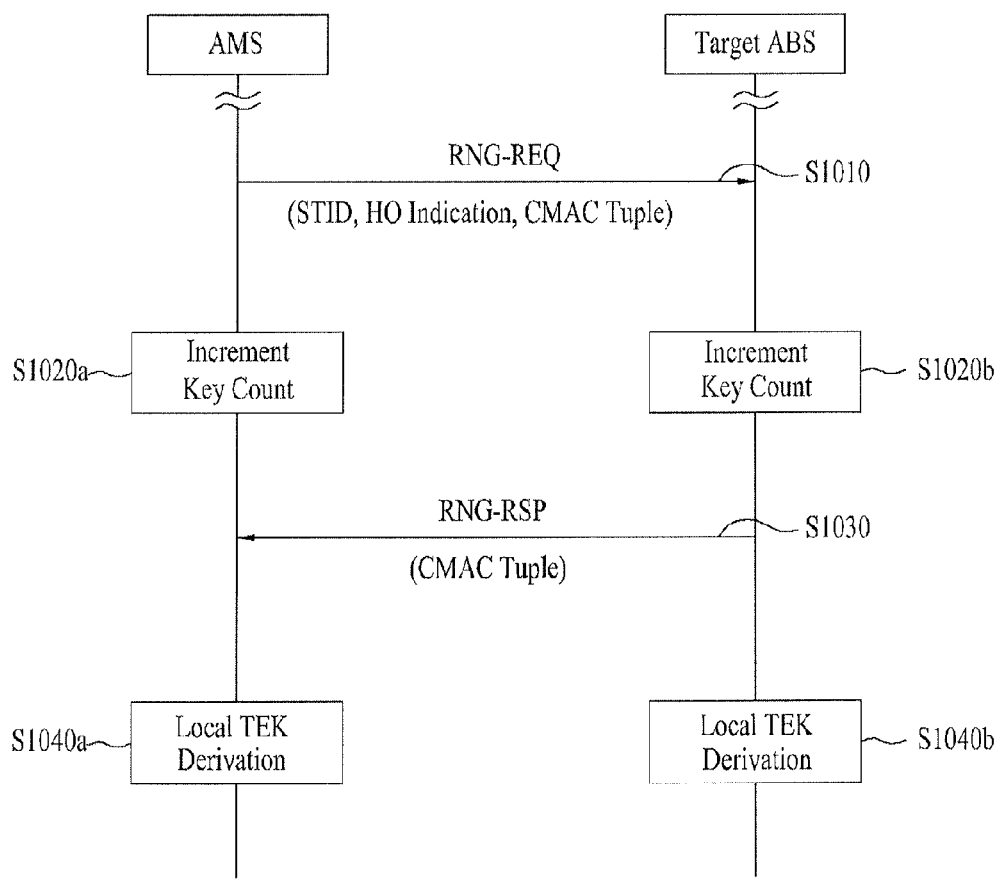
FIG. 10 is a diagram illustrating a method for key count management when a mobile station re-enters a network in a connected mode in accordance with the embodiment of the present invention.

FIG. 10 is a diagram illustrating a method for key count management when a mobile station re-enters a network in a connected mode in accordance with the embodiment of the present invention.

If the mobile station performs network reentry from the connected mode due to connection loss or uncoordinated handover, the mobile station and the base station can respectively generate two TEKs by using the increased key count value. This is possible if there is AK grant. Alternatively, if a new AK is generated, the key count value can be reset. In FIG. 10, key count can be synchronized by referring to EKS included in PN. If the TEK is updated, communication between the mobile station and the base station is resumed.

Referring to FIG. 10, the mobile station AMS can transmit a ranging request (RNG-REQ) message to the target base station ABS to perform network reentry, wherein the ranging request message includes one or more of station identifier (STID), handover (HO) indication, and CMAC tuple (S1010).

Since the condition for increasing key count, i.e., connection loss or uncoordinated handover has occurred in FIG. 10, the mobile station and the target base station can be synchronized by the increased key count value or reset key count value. Namely, the mobile station and the target base station can identify whether the mobile station and the base station use the same TEK, by referring to EKS included in the PN (S1020a, S1020b).

The target base station transmits a ranging response (RNG-RSP) message, which includes CMAC tuple used in the target base station, to the mobile station in response to the ranging request message (S1030).

The mobile station and the base station can respectively generate (or update) two TEKs by using the reset or increased key count value (S1040a, S1040b).

Method for Key Count Management During Location Update

Figure 11:
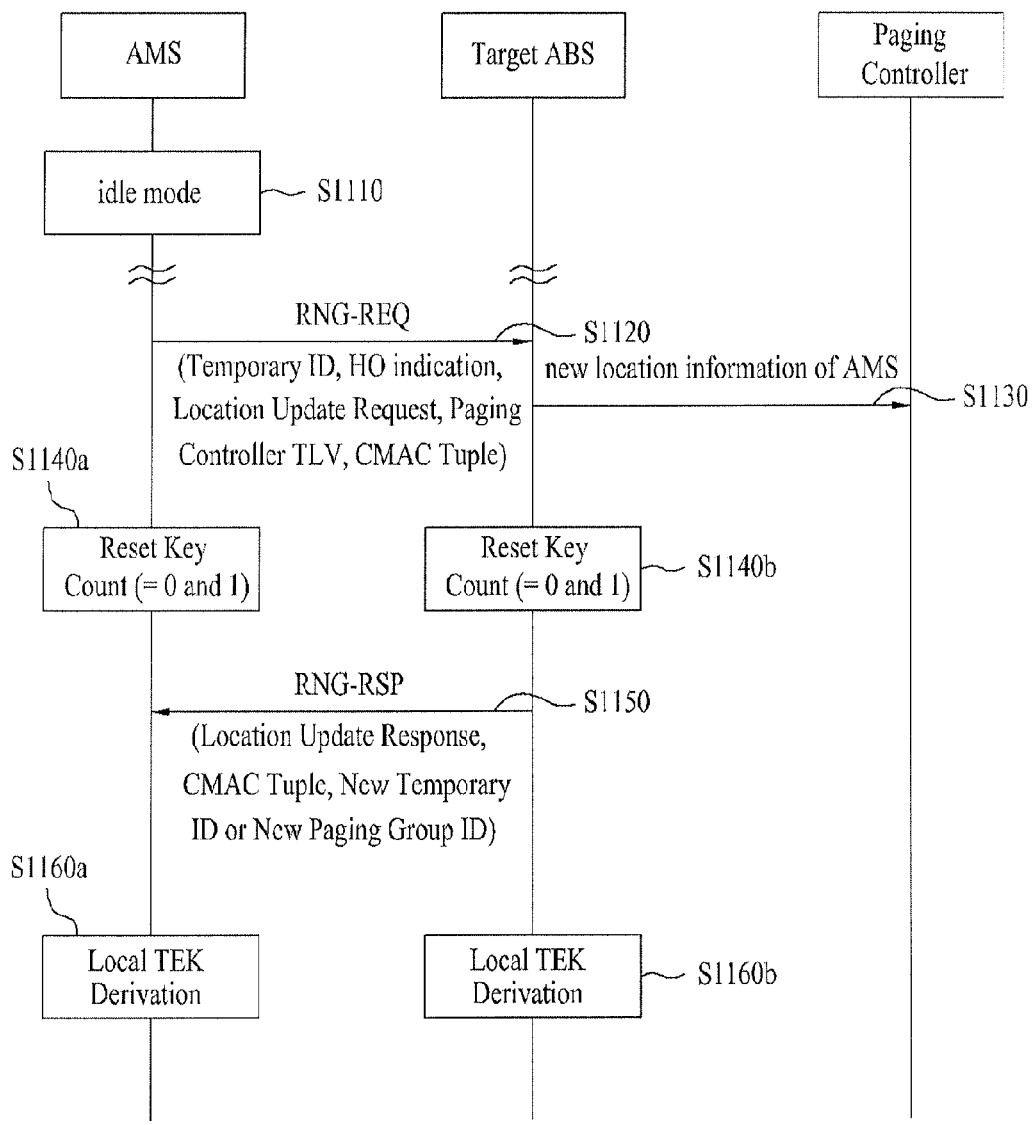
FIG. 11 is a diagram illustrating one of methods for key count management when a mobile station in an idle mode releases a key count in accordance with the embodiment of the present invention.

FIG. 11 is a diagram illustrating one of methods for key count management when a mobile station in an idle mode releases key count in accordance with the embodiment of the present invention.

If location update is performed in an idle mode, the mobile station AMS and the base station ABS can generate (or update) a new TEK after AK grant. In this case, a paging group to which the mobile station belongs and the target base station are changed, whereby an AK to be used by the mobile station can be generated newly. Namely, the mobile station and the base station can update the TEK by resetting the key count value.

Referring to FIG. 11, the mobile station AMS enters the idle mode in the serving base station S-ABS (S1110).

As the mobile station moves to a neighboring base station, the mobile station can perform location update with the target base station (T-ABS). Accordingly, the mobile station can transmit the ranging request message to the target base station to perform location update. At this time, the ranging request message can include one or more of a temporary ID, a handover indication parameter, a location update request parameter, a paging controller TLV, and a CMAC tuple value (S1120).

The target base station which has received the ranging request message can transfer new location information of the mobile station to a paging controller (PC) (S1130).

At this time, the mobile station and the target base station can release the existing key count and reset their key counts to '0' and '1' to generate two TEKs, respectively (S1140a, S1140b).

The target base station can transmit the ranging response message to the mobile station in response to the ranging request message. At this time, the ranging response message can include one or more of a location update response parameter, a CMAC tuple, a new temporary ID, and a new paging group ID (S1150).

The mobile station and the target base station can respectively generate two new TEKs by using the reset key count value (S1160a, 1160b).

At this time, the mobile station and the target base station can identify whether the mobile station and the base station use the same TEK, by referring to EKS included in the PN.

Figure 12:
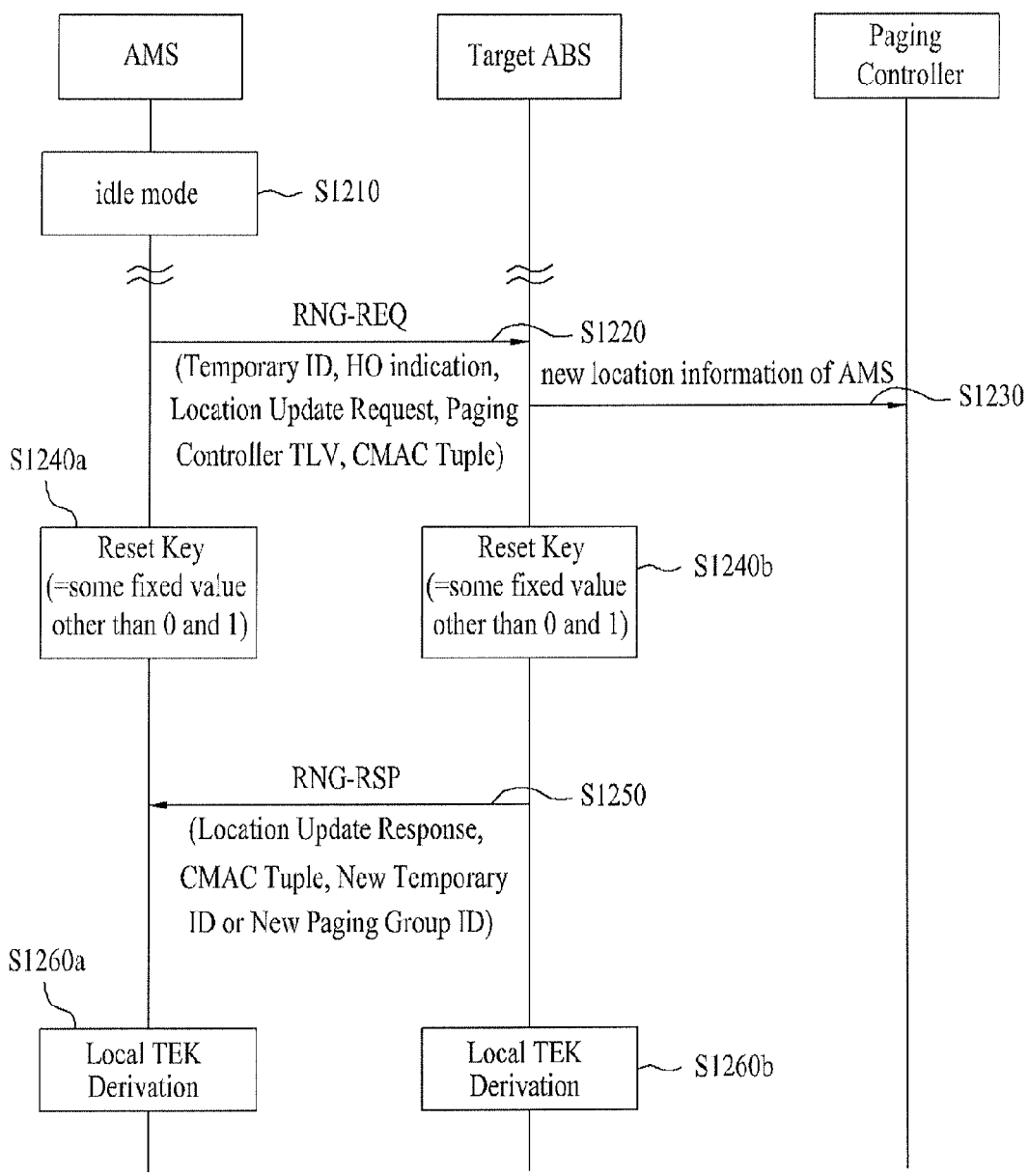
FIG. 12 is a diagram illustrating another one of methods for key count management when a mobile station in an idle mode releases a key count in accordance with the embodiment of the present invention.

FIG. 12 is a diagram illustrating another one of methods for key count management when a mobile station in an idle mode releases key count in accordance with the embodiment of the present invention.

If location update is performed in an idle mode, the mobile station AMS and the base station ABS can generate (or update) a new TEK. In this case, the TEK can be generated after AK grant. If a paging group to which the mobile station belongs and the target base station are changed, an AK to be used by the mobile station can be generated newly.

Most of steps according to the embodiment of the present invention which will be described with reference to FIG. 12 are performed similarly to the embodiment described with reference to FIG. 11. However, steps of synchronizing key count and generating a TEK are different from those of FIG. 11. Hereinafter, only parts different from those of FIG. 11 will be described. For the other parts, refer to FIG. 11.

The mobile station and the target base station can identify whether the mobile station and the base station use the same TEK, by referring to EKS included in the PN. At this time, the mobile station and the base station can release the existing key count and reset the key count to a predetermined fixed value. The mobile station and the target base station can set the key counts to two consecutive key count values (S1240a, S1240b).

The mobile station and the target base station can respectively generate two new TEKs by using the reset key count values, respectively (S1260a, 1260b).

Figure 13:
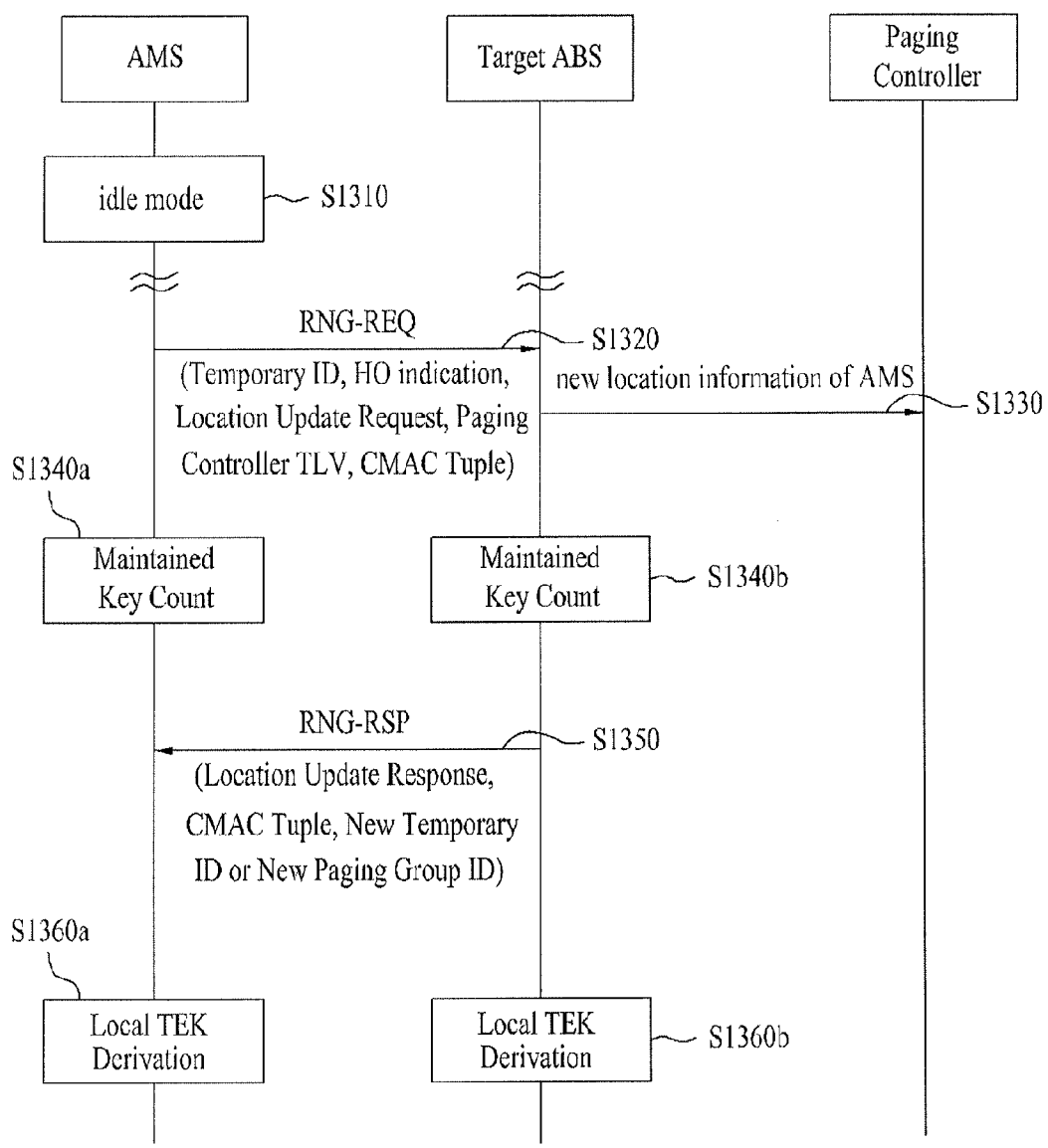
FIG. 13 is a diagram illustrating one of methods for key count management when a mobile station in an idle mode does not release a key count in accordance with the embodiment of the present invention.

FIG. 13 is a diagram illustrating one of methods for key count management when a mobile station in an idle mode does not release key count in accordance with the embodiment of the present invention.

If location update is performed in an idle mode, the mobile station AMS and the base station ABS can generate (or update) a new TEK after AK grant. In this case, a paging group to which the mobile station belongs and the target base station are changed, whereby an AK to be used by the mobile station can be generated newly. At this time, the mobile station and the base station can update the TEK by using the existing key count value.

Referring to FIG. 13, the mobile station AMS enters the idle mode in the serving base station S-ABS (S1310).

As the mobile station moves to a neighboring base station, the mobile station can perform location update with the target base station T-ABS. Accordingly, the mobile station can transmit the ranging request message to the target base station to perform location update. At this time, the ranging request message can include one or more of a temporary ID, a handover indication parameter, a location update request parameter, a paging controller TLV, and a CMAC tuple value (S1320).

The target base station which has received the ranging request message can transfer new location information of the mobile station to a paging controller (PC) (S1330).

The mobile station and the target base station can continue to maintain the existing key count without releasing it even in the case that the AK is newly generated, so as to generate two TEKs, respectively. At this time, the mobile station and the target base station can identify whether the mobile station and the base station use the same TEK, by referring to EKS included in the PN (S1340a, S1340b).

The target base station can transmit the ranging response message to the mobile station in response to the ranging request message. At this time, the ranging response message can include one or more of a location update response parameter, a CMAC tuple, a new temporary ID, and a new paging group ID (S1350).

The mobile station and the target base station can respectively generate two new TEKs by using the reset key count values, respectively (S1360a, 1360b).

Figure 14:
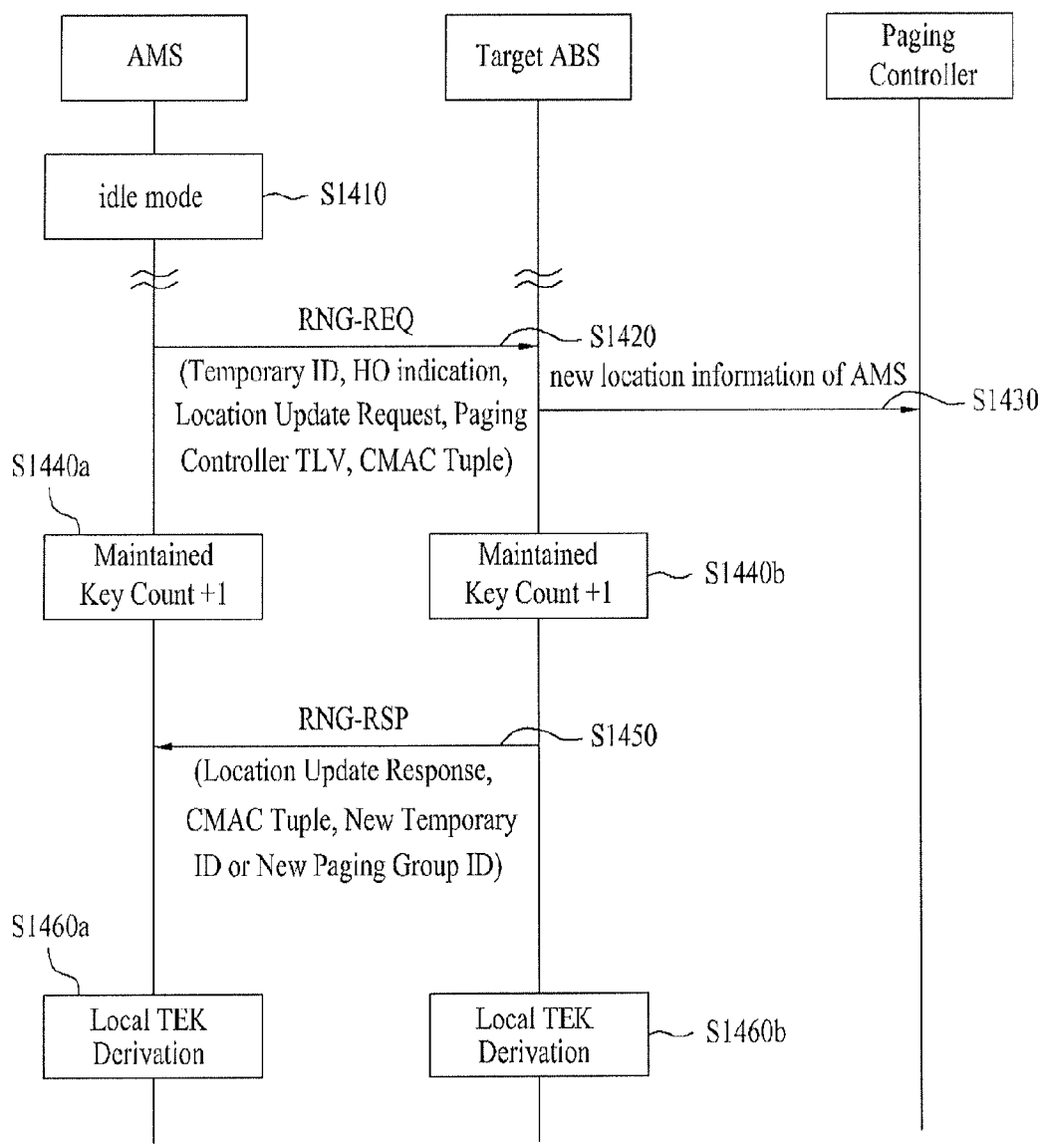
FIG. 14 is a diagram illustrating another one of methods for key count management when a mobile station in an idle mode does not release a key count in accordance with the embodiment of the present invention.

FIG. 14 is a diagram illustrating another one of methods for key count management when a mobile station in an idle mode does not release key count in accordance with the embodiment of the present invention.

Most of steps which will be described with reference to FIG. 14 are similar to those of the embodiment described with reference to FIG. 13. However, steps of managing and generating a TEK are different from those of FIG. 13. Hereinafter, only parts different from those of FIG. 13 will be described. For the other parts, refer to FIG. 13.

In FIG. 14, the mobile station and the target base station can continue to maintain the existing key count without releasing it even in the case that the AK is newly generated, so as to generate two TEKs, respectively. At this time, the mobile station and the target base station can identify whether the mobile station and the base station use the same TEK, by referring to EKS included in the PN. Also, the mobile station and the target base station can reset their key count values by increasing each of them by 1 (S1440a, S1440b).

The mobile station and the target base station can respectively generate two new TEKs by using the reset key count values (S1460a, 1460b).

Method for Key Count Management During Network Reentry in Idle Mode or Entry to Idle Mode If the mobile station reenters the network in an idle mode, the mobile station and the base station should generate (or update) a new TEK. However, the TEK can be generated after AK grant from the base station. In another embodiment of the present invention, the paging group to which the base station belongs is not changed but the target base station for reentry is changed. Also, the target base station for reentry may not be changed. If the target base station for reentry is not changed, the AK is not changed. In addition, if the target base station for reentry is changed, the AK should newly be generated.

When the mobile station enters the idle mode from a normal mode, it resets key count regardless of the AK and updates the TEK if key count is not maintained. Also, when the mobile station enters the idle mode, it can reuse the previous key count or update the TEK by using the increased key count if key count is maintained. However, if the AK is not changed, the mobile station does not need to reset key count, and has only to update the TEK by using the previous key count or the increased key count.

In other words, as described above, key count is reset only if the AK is reset. Key count can be synchronized by using the EKS included in the PN. Namely, the mobile station and the target base station can identify whether the mobile station and the base station use the same TEK, by referring to the EKS included in the PN. However, if the reset key count is used during network reentry as the key count is released, two TEKs are generated in the same manner as initial authentication. Accordingly, the key count value of '0' and/or '1' may be used, or other fixed value may be used as the key count value.

Figure 15:
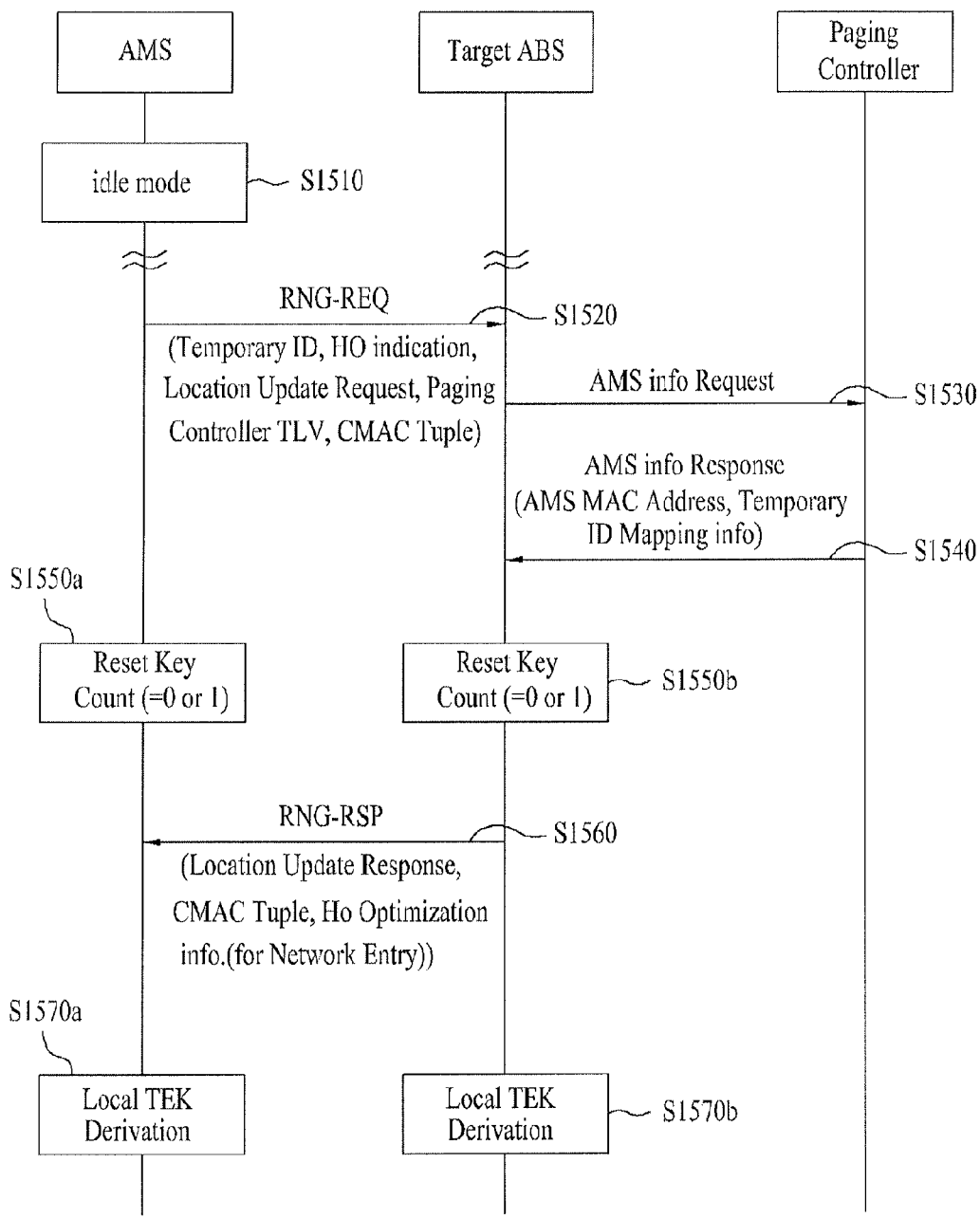
FIG. 15 is a diagram illustrating one of methods for key count management when a mobile station in an idle mode releases a key count while re-entering a network in accordance with the embodiment of the present invention.

FIG. 15 is a diagram illustrating one of methods for key count management when a mobile station in an idle mode releases key count during network reentry in accordance with the embodiment of the present invention.

If the mobile station reenters the network in the idle mode, the mobile station AMS and the base station ABS can generate (or update) a new TEK after AK grant. In another embodiment of the present invention, a paging group to which the mobile station belongs is not changed but the target base station for network reentry can be changed. If the target base station is changed, it is preferable that the AK is newly generated. Namely, the mobile station and the base station can update the TEK by resetting the key count value.

Referring to FIG. 15, the mobile station AMS enters the idle mode in the serving base station S-ABS (S1510).

As the mobile station moves to a neighboring base station, the mobile station can reenter the network managed by the target base station T-ABS. Accordingly, the mobile station can transmit the ranging request message to the target base station to synchronize with the target base station. At this time, the ranging request message can include one or more of a temporary ID, a handover indication parameter, a location update request parameter, a paging controller TLV, and a CMAC tuple value (S1520).

The target base station which has received the ranging request message (e.g., AMS Info request) can transmit the request message to a paging controller (PC) to request information related to the mobile station (AMS information) (S1530).

The paging controller can transmit the response message (e.g., AMS Info response) to the target base station in response to the request message. At this time, the response message can include MAC address of the mobile station and information related to the mobile station mapped with temporary ID (S1540).

The mobile station and the target base station can synchronize key counts by using the EKS included in the PN. At this time, the mobile station and the target base station can release the existing key count and reset their key count to '0' and/or '1' to generate one TEK, respectively (S1550a, S1550b).

The target base station can transmit the ranging response message to the mobile station in response to the ranging request message. At this time, the ranging response message can include one or more of a CMAC tuple, a location update response parameter, and handover optimization information for network reentry (S1560).

The mobile station and the target base station can respectively generate one new TEK by using the reset key count value. At this time, the mobile station and the target base station can generate a TEK using the method illustrated in the Equation 1 (S1570a, S1570b).

Figure 16:
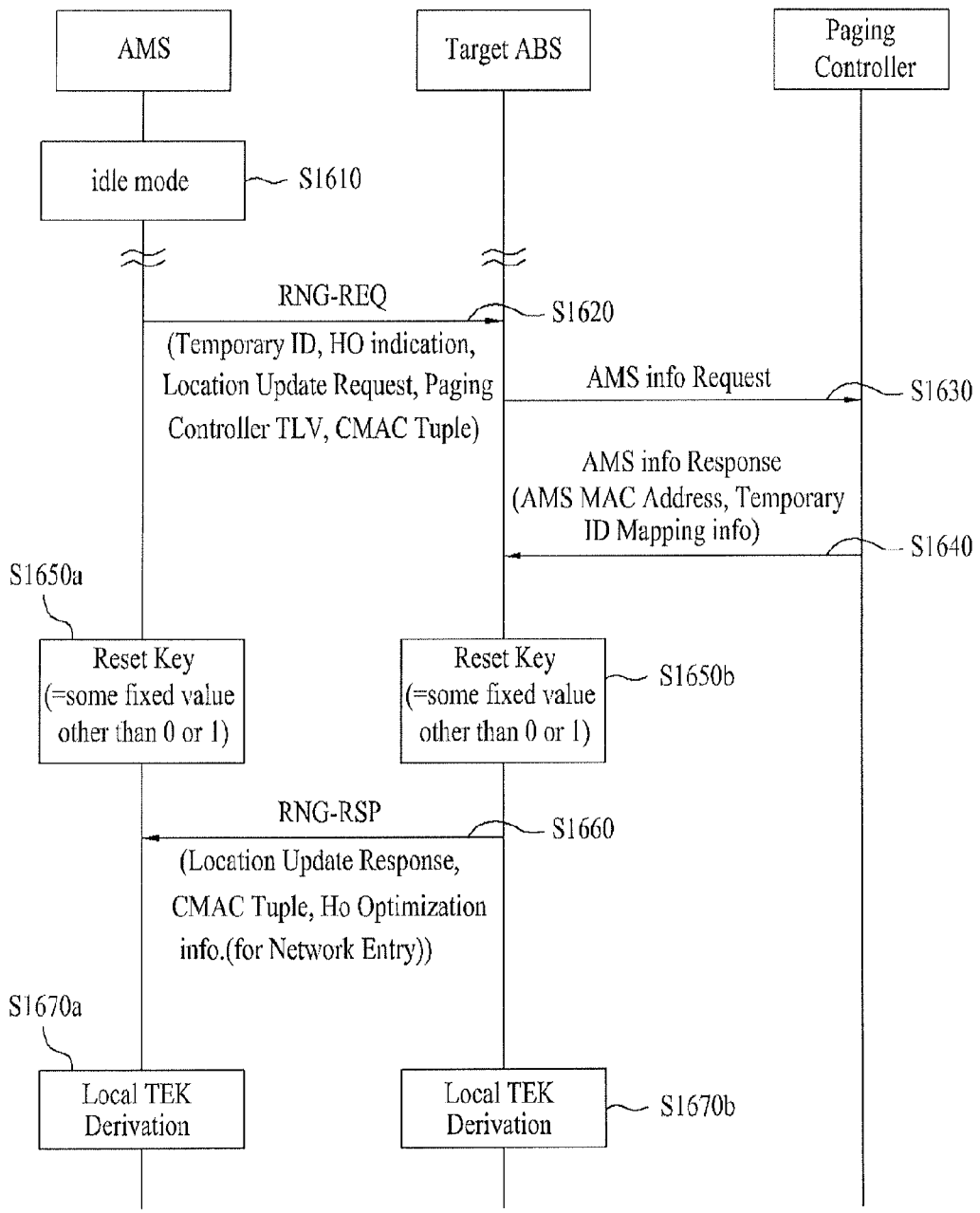
FIG. 16 is a diagram illustrating another one of methods for key count management when a mobile station in an idle mode releases a key count while re-entering a network in accordance with the embodiment of the present invention.

FIG. 16 is a diagram illustrating another one of methods for key count management when a mobile station in an idle mode releases key count during network reentry in accordance with the embodiment of the present invention.

Basic matters according to the embodiment of the present invention which will be described with reference to FIG. 16 are similar to those of the embodiment described with reference to FIG. 15. However, steps of managing key count are different from those of FIG. 15. Hereinafter, only parts different from those of FIG. 15 will be described. For the other parts, refer to FIG. 15.

Referring to FIG. 16, the mobile station and the target base station can synchronize key counts by using the EKS included in the PN. At this time, the mobile station and the target base station can release the existing key count and reset the key count to a predetermined fixed value other than '0' and/or '1' (S1650a, S1650b).

The mobile station and the target base station can respectively generate one TEK by using the reset key count value (S1670a, S1670b).

Figure 17:
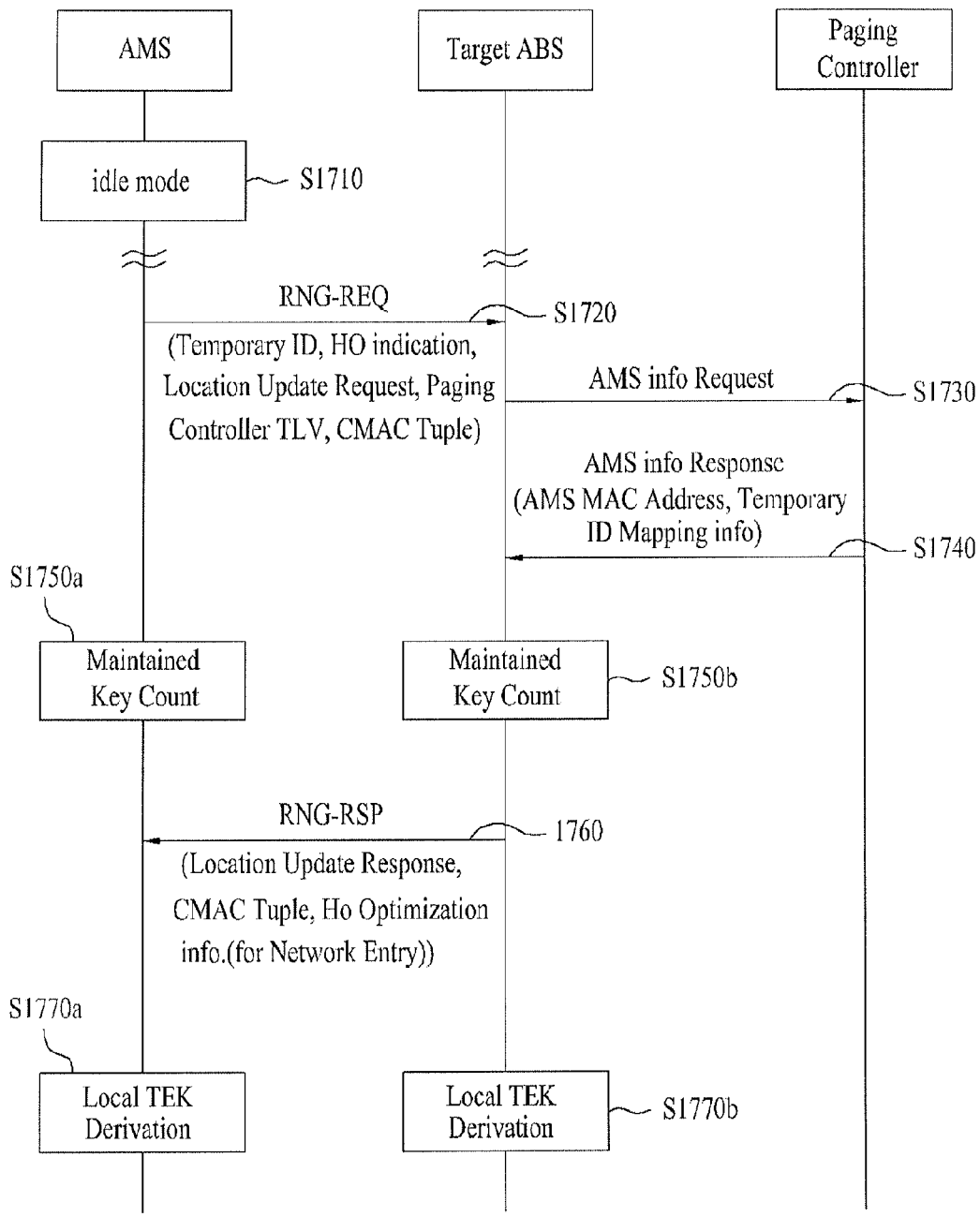
FIG. 17 is a diagram illustrating one of methods for key count management when a mobile station in an idle mode does not release a key count while re-entering a network in accordance with the embodiment of the present invention.

FIG. 17 is a diagram illustrating one of methods for key count management when a mobile station in an idle mode does not release key count during network reentry in accordance with the embodiment of the present invention.

If the mobile station reenters the network in the idle mode, the mobile station AMS and the base station ABS can generate (or update) a new TEK after AK grant. In another embodiment of the present invention, a paging group to which the mobile station belongs and the target base station for network reentry may not be changed. If the target base station is not changed, the AK is not changed. In this case, the key count value can be maintained without being reset.

Referring to FIG. 17, the mobile station AMS enters the idle mode in the serving base station S-ABS (S1710).

As the mobile station moves to a neighboring base station, the mobile station can reenter the network managed by the target base station T-ABS. Accordingly, the mobile station can transmit the ranging request message to the target base station to synchronize with the target base station. At this time, the ranging request message can include one or more of a temporary ID, a handover indication parameter, a location update request parameter, a paging controller TLV, and a CMAC tuple value (S1720).

The target base station which has received the ranging request message (e.g., AMS Info request) can transmit the request message to a paging controller (PC) to request information related to the mobile station (AMS information) (S1730).

The paging controller can transmit the response message (e.g., AMS Info response) to the target base station in response to the request message. At this time, the response message can include MAC address of the mobile station and information related to the mobile station mapped with temporary ID (S1740).

The mobile station and the target base station can synchronize key counts by using the EKS included in the PN. At this time, the mobile station and the target base station can maintain the existing key counts without releasing them to generate two TEKs, respectively (S1750a, S1750b).

The target base station can transmit the ranging response message to the mobile station in response to the ranging request message. At this time, the ranging response message can include one or more of a CMAC tuple, a location update response parameter and handover optimization information for network reentry (S1760).

The mobile station and the target base station can respectively generate two new TEKs by using the existing key count values. At this time, each of the mobile station and the target base station can generate two TEKs using the method illustrated in the Equation 1, Equation 2, Equation 3, or Equation 4 (S1770a, S1770b).

Figure 18:
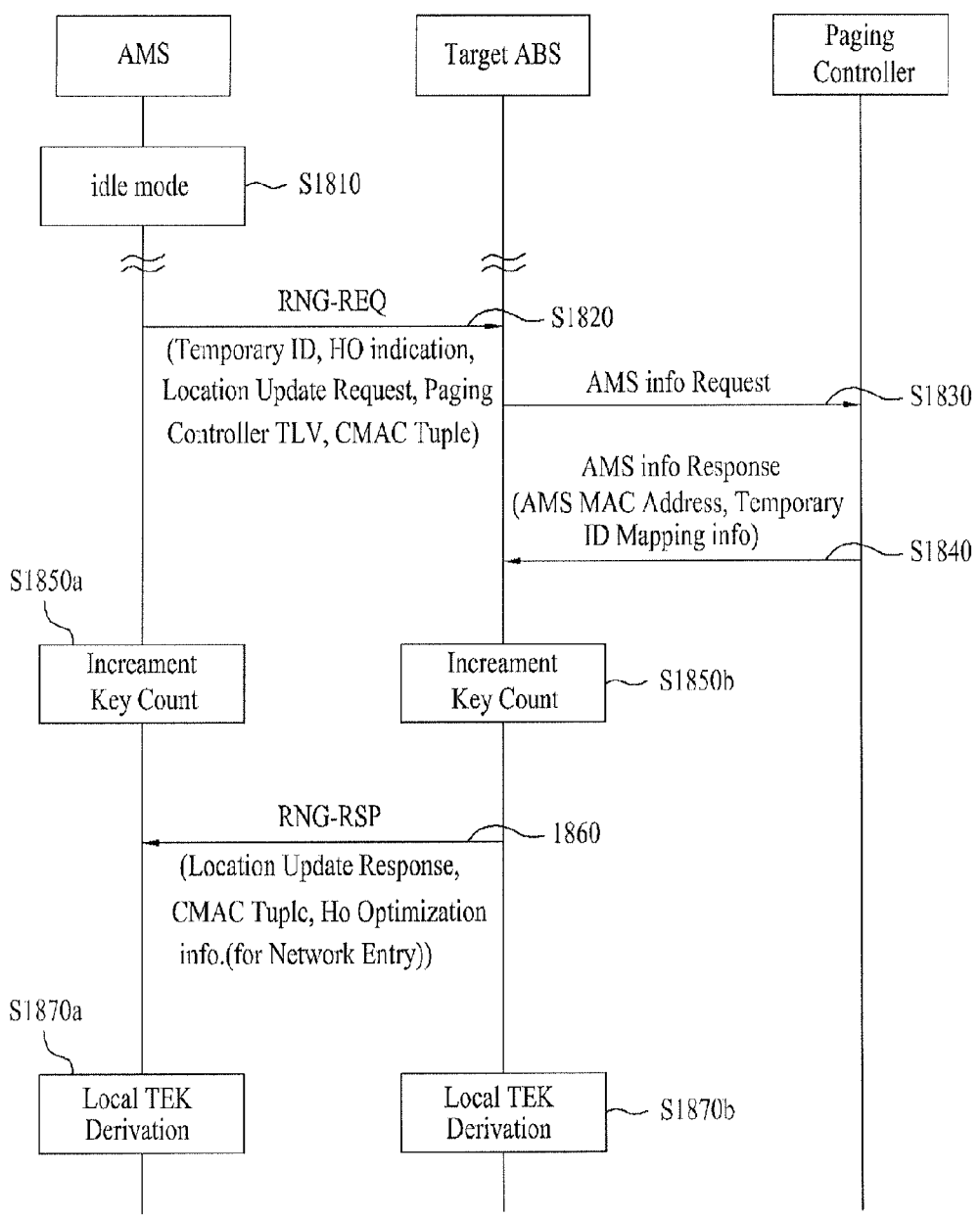
FIG. 18 is a diagram illustrating another one of methods for key count management when a mobile station in an idle mode does not release a key count while re-entering a network in accordance with the embodiment of the present invention.

FIG. 18 is a diagram illustrating another one of methods for key count management when a mobile station in an idle mode releases key count during network reentry in accordance with the embodiment of the present invention.

Basic assumptions according to the embodiment of the present invention which will be described with reference to FIG. 18 are similar to those of the embodiment described with reference to FIG. 17. However, steps of managing key count are different from those of FIG. 17. Hereinafter, only parts different from those of FIG. 17 will be described. For the other parts, refer to FIG. 17.

Referring to FIG. 18, the mobile station and the target base station can identify whether the mobile station and the base station use the same TEKs, by referring the EKS included in the PN. At this time, the mobile station and the base station can maintain the existing key counts without releasing it. However, in FIG. 18, the mobile station and the base station can set the existing key count values to increase by '1' or predetermined increased values, respectively (S1850a, S1850b).

The target base station can transmit the ranging response message to the mobile station in response to the ranging request message. At this time, the ranging response message can include one or more of a CMAC tuple, a location update response parameter and handover optimization information for network reentry (S1860).

The mobile station and the target base station can respectively generate two new TEKs by using the increased key count values (S1870a, S1870b).

Figure 19:
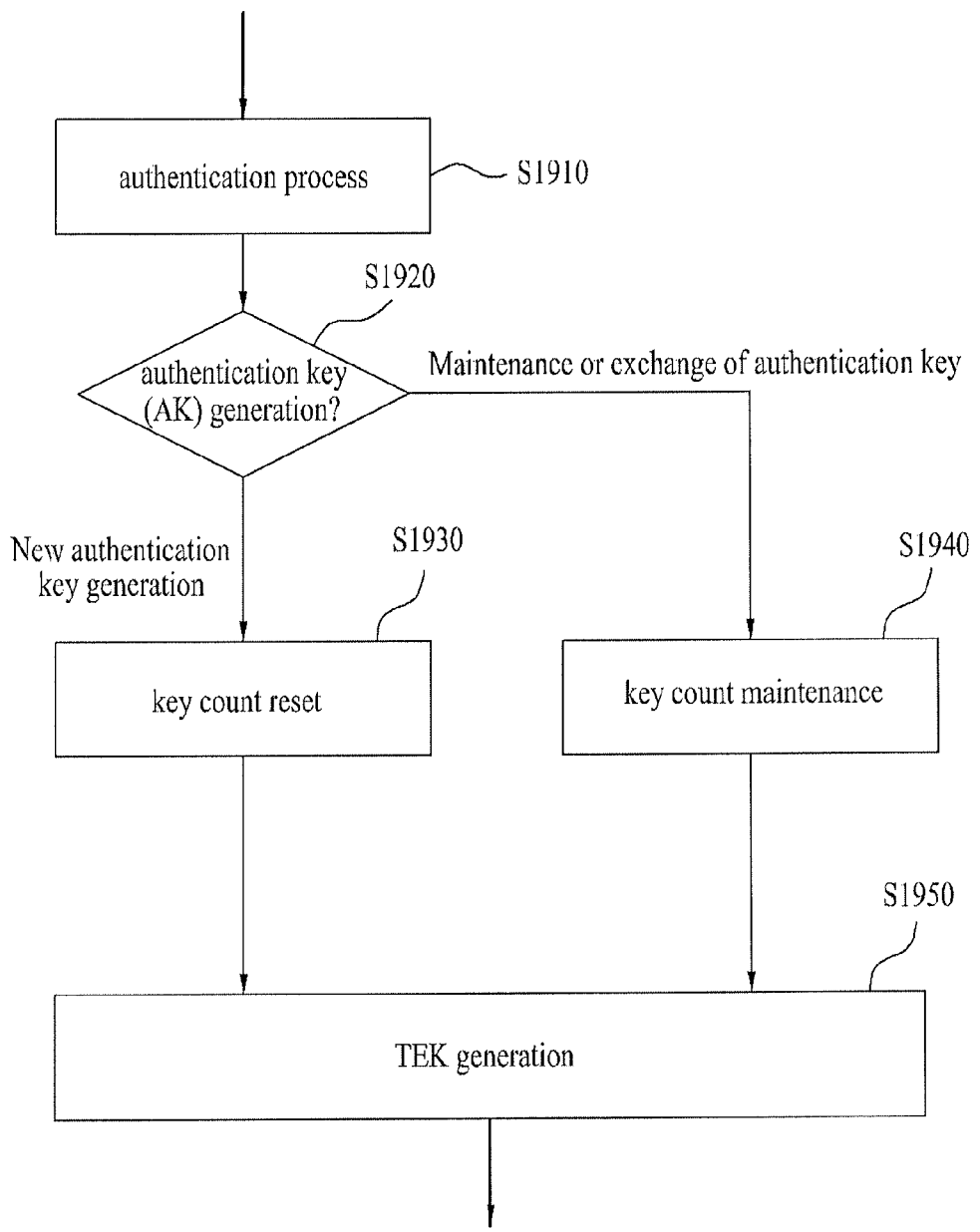
FIG. 19 is a diagram illustrating a method for generating a TEK, which can be applied to the embodiments of the present invention.

FIG. 19 is a diagram illustrating a method for generating a TEK, which can be applied to the embodiments of the present invention.

Referring to FIG. 19, the mobile station can perform an EAP based authentication process with the base station during an initial access process (S1910).

After the authentication process ends, the mobile station and the base station can generate a pairwise master key (PMK), an AK, and a cipher-based message authentication code (CMAC) key through a key agreement process, verify the generated PMK, AK and CMAC key, and perform a key agreement process to exchange other key materials (not shown).

At this time, the mobile station and/or the base station generates a master key (MSK) during the EAP based authentication process. Most of security keys are directly/indirectly generated by the mobile station and/or the base station by using the MSK. The mobile station and/or the base station generates a pairwise master key (PMK) by using the MSK, and the PMK is used for generation of the AK. The AK is used for generation of the TEK and the CMAC key later (S1920).

In the embodiments of the present invention, the key agreement process can be performed as follows.

First of all, after the EAP based authentication process ends, the base station can transmit a first key agreement message (e.g., AAI_PKM-RSP), which includes random Nonce (e.g., NONCE_ABS), to the mobile station. The mobile station can generate a PMK, an AK, a CMAC key using the Nonce. Also, the mobile station can transmit a second key agreement message (e.g., AAI_PKM-REQ), which includes Nonce (e.g., NONCE_ABS, NONCE_AMS) used by the mobile station and the base station, to the base station. The base station can generate the PMK, the AK, and the CMAC key by using the Nonce received from the mobile station. Afterwards, the base station can transmit a third key agreement message (e.g., AAI_PKM-RSP), which includes Nonce (e.g., NONCE_ABS, NONCE_AMS) and security association identifiers (SAIDs), to the mobile station. The mobile station and the base station can respectively generate the AK and exchange SAID with each other through the key agreement process.

In the embodiments of the present invention, security association (SA) means congregation of information required for communication with privacy between the mobile station AMS and the base station ABS. Security association can be shared through an advance air interface (AAI) network between the mobile station and the base station. Security association is identified using a security association identifier. Security association can be used for each of unicast flows.

Referring to FIG. 19 again, if the authentication key is newly generated in step S1920, key counts are reset. At this time, key counts can respectively be reset to initial value of '0' and/or '1' (S1930).

Also, if the authentication key is not newly generated but maintained in step S1920, the mobile station and the base station can continue to maintain the key counts without releasing them (S1940).

In the embodiments of the present invention, it is assumed that two TEKs are generated for each security association (SA). Accordingly, it is preferable that the mobile station and the base station have two consecutive key counts, respectively.

The mobile station and the base station can generate two TEKs by using the reset security association identifier (SAID), the authentication key (AK), and the key counts. However, if the key counts are not released (e.g., in case of network reentry in an idle mode), the mobile station and/or the base station can generate only one TEK.

The embodiment of the present invention described with reference to FIG. 19 can be applied to the embodiments of the present invention described with reference to FIG. 9 to FIG. 19.

Figure 20:
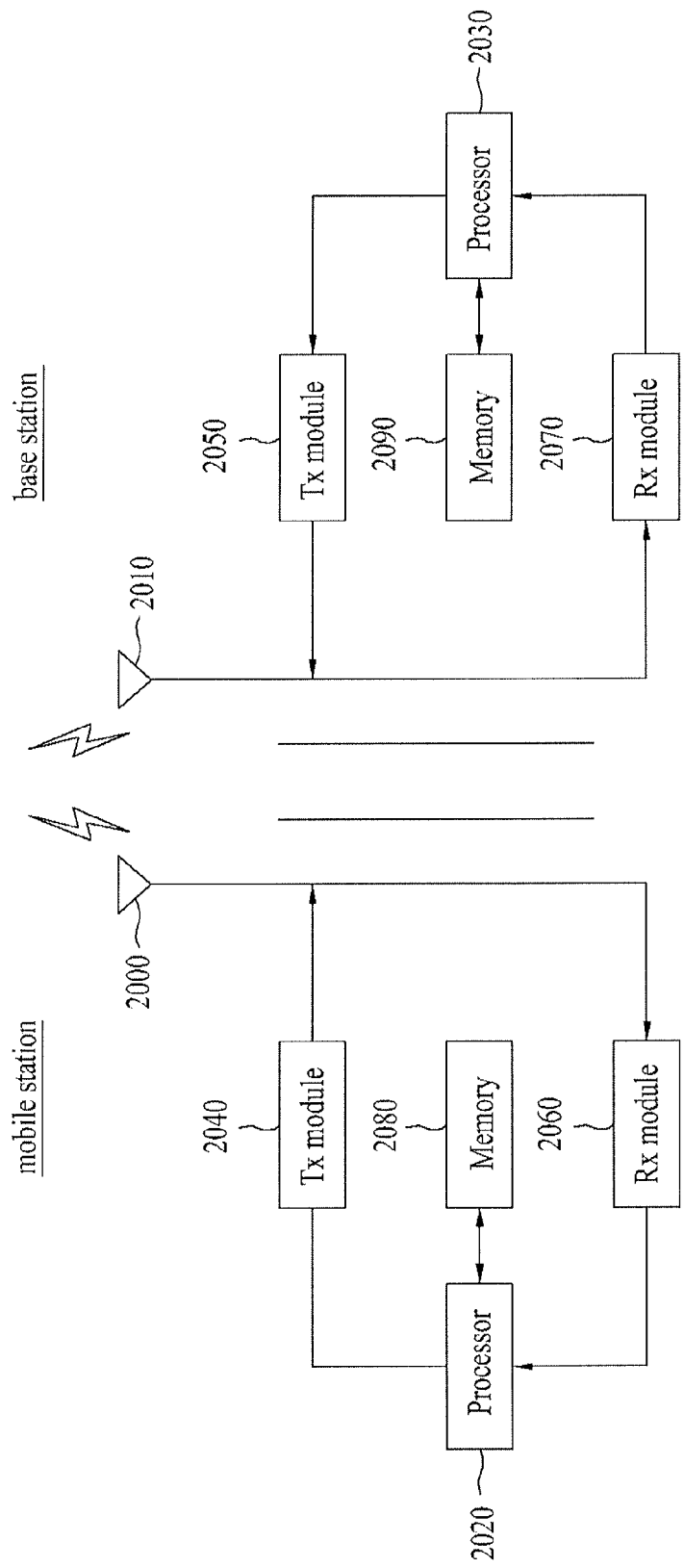
FIG. 20 is a diagram illustrating a mobile station and a base station through which the embodiments illustrated in FIG. 2 to FIG. 19 are carried out.

FIG. 20 is a diagram illustrating a mobile station and a base station through which the embodiments illustrated in FIG. 2 to FIG. 19 are carried out.

The mobile station serves as a transmitter in the uplink and serves as a receiver in the downlink. Also, the base station serves as a receiver in the uplink and serves as a transmitter in the downlink.

The mobile station AMS and the base station ABS respectively include an antenna 2000, 2010 transmitting and receiving information, data, signal and/or message, a Tx module 2040, 2050 transmitting a message by controlling the antenna, an Rx module 2060, 2070 receiving a message by controlling the antenna, a memory 2080, 2090 storing information related to communication with the base station, and a processor 2020, 2030 controlling the Tx module, the Rx module, and the memory.

The antenna 2000, 2010 serves to transmit a signal generated by the Tx module 2040, 2050 to the outside or receive a radio signal from the outside to transfer the radio signal to the Rx module 2060, 2070. If a MIMO antenna function is supported, two or more antennas may be provided.

The processor 2020, 2030 generally controls the whole operation of the mobile station or the base station. Particularly, the processor can perform a controller function for performing the aforementioned embodiments of the present invention, a medium access control (MAC) frame variable control function according to service characteristics and radio wave condition, a power saving mode function for controlling an operation of an idle mode, a handover function, an authentication and encryption function, etc.

Furthermore, the processor 2020, 2030 can include an encryption module that can control encryption of various messages. For example, the mobile station and the base station can perform the methods described with reference to FIG. 2 to FIG. 19 by using the processor and the encryption module included in the processor.

The Tx module 2040, 2050 performs predetermined coding and modulation for a signal and/or data, which are scheduled from the processor 2020, 2030 and then transmitted to the outside, and then transfers the coded and modulated data to the antenna 2000, 2010.

The Rx module 2060, 2070 performs decoding and demodulation for the radio signal received from the outside through the antenna 2000, 2010 to recover original data and then transfer the recovered data to the processor 2020, 2030.

The memory 2080, 2090 may store a program for processing and control of the processor 2020, 2030, or may perform a function for temporarily storing input/output data (in case of the mobile station, UL grant allocated from the base station, system information, STID, FID, action time, and frame offset information).

Also, the memory 2080, 2090 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Hereinafter, functions of the mobile station and the base station will be described in more detail.

The mobile station and the base station described in FIG. 20 further include a counter (not shown). The counter is a module (or means) processing key counts used in the embodiments of the present invention. The counter may be configured separately from the other modules or may be included in the processor 2020, 2030. The key count values processed by the counter can be stored in the counter or each memory 2080, 2090.

In the embodiments of the present invention, it is preferable that key counts are reset after authentication or re-authentication is completed. If the key counts are reset, the key count values can be set to two consecutive values of '0' and '1' each other. However, if the mobile station releases the key counts in the idle mode and uses the reset key counts during network reentry, since the mobile station has only to generate one TEK unlike initial authentication, the mobile station and the base station can set the key count values to '0' or '1'.

In FIG. 20, the processor of the mobile station can perform initial authentication, re-authentication process, and key agreement process with the serving base station. Also, the processor can manage the key count values, and can generate and update the TEK in accordance with the method illustrated in the Equation 1 by using the key count values.

The mobile station and the base station of FIG. 20 transmit and receive messages under the communication environments described with reference to FIG. 2 to FIG. 19, manage key count values, and perform functions for generating a TEK. Namely, the mobile station and the base station can perform the operation described with reference to FIG. 2 to FIG. 19 by using the aforementioned configuration elements to conform to each function.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Moreover, examples of the mobile station include a personal digital assistant (PDA), a hand-held PC, a notebook PC, a smart phone, and a multimode-multiband (MM-MB) terminal.

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiment of the present invention can be implemented by a type of a module, a procedure, or a function, which performs functions or operations described as above. For example, a software code may be stored in a memory unit 2080, 2090 and then may be driven by a processor 2020, 2030. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of the various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

What is claimed is:

1. A method for a traffic encryption key (TEK) count management, the method comprising:

transmitting, by a mobile station (MS) in an idle mode to a target base station (TBS), a ranging request message in order to perform a location update procedure in the idle mode, the ranging request message including a temporary identifier (ID) which is used instead of a medium access control (MAC) address of the MS;

receiving a ranging response message in response to the ranging request message;

identifying an authentication key (AK) by transmitting the ranging request message and receiving the ranging response message;

resetting a first TEK counter and a second TEK counter to have initial values as consecutive values for generating two new TEKs;

generating a first TEK of the two new TEKs by using a security association identifier (SAID) shared with the TBS, the AK and the first TEK counter; and generating a second TEK of the two new TEKs by using the SAID, the AK and the second TEK counter.

2. The method of claim 1, wherein the first TEK and the second TEK are updated due to expiration of each TEK lifetime.

3. The method of claim 1, wherein the first TEK and the second TEK are generated using a Dot16KDF algorithm.

4. The method of claim 1, wherein the first TEK count and the second TEK count are reset if the AK is newly generated.

5. The method of claim 1, wherein the AK is generated based on the temporary ID.

6. The method of claim 1, wherein the ranging response message includes a new temporary ID for protecting a location privacy of the MS.

7. A method for a traffic encryption key (TEK) count management, the method comprising:

receiving, by a target base station (TBS) from a mobile station (MS) in an idle mode, a ranging request message for a location update procedure, the ranging request message including a temporary identifier (ID) which is used instead of a medium access control (MAC) address of the MS;

transmitting, by the TBS to the MS, a ranging response message in response to the ranging request message;

identifying an authentication key (AK) by receiving the ranging request message and transmitting the ranging response message;

resetting a first TEK counter and a second TEK counter to have initial values as consecutive values for generating two new TEKs;

generating a first TEK of the two new TEKs by using a security association identifier (SAID) shared with the MS, the AK and a first TEK counter; and generating a second TEK of the two new TEKs by using the SAID, the AK and the second TEK counter.

8. The method of claim 7, wherein the first TEK and the second TEK are updated due to expiration of each TEK lifetime.

9. The method of claim 7, wherein the first TEK and the second TEK are generated using a Dot16KDF algorithm.

10. The method of claim 7, wherein the first TEK count and the second TEK count are reset if the AK is newly generated.

11. The method of claim 7, wherein the AK is generated based on the temporary ID.

12. The method of claim 7, wherein the ranging response message includes a new temporary ID for protecting a location privacy of the MS.

13. The mobile station of claim 7, wherein the ranging response message includes a new temporary ID for protecting a location privacy of the MS.

14. A mobile station (MS) for managing a traffic encryption key (TEK) count, the MS comprising:
   a transmission (Tx) module;
   a reception (Rx) module; and
   a processor for managing two TEK counts,
   wherein the processor is configured to:
   transmit, through the Tx module to a target base station (TBS), a ranging request message in order to perform a location update procedure in an idle mode, the ranging request message including a temporary identifier (ID) which is used instead of a medium access control (MAC) address of the MS;
   receive, through the Rx module from the TBS, a ranging response message in response to the ranging request message;
   identify an authentication key (AK) by transmitting the ranging request message and receiving the ranging response message;
   reset a first TEK counter and a second TEK counter to have initial values as consecutive values for generating two new TEKs;
   generate a first TEK of the two new TEKs by using a security association identifier (SAID) shared with the TBS, the AK and the first TEK counter; and
   generate a second TEK of the two new TEKs by using the SAID, the AK and the second TEK counter.

15. The apparatus of claim 14, wherein the first TEK and the second TEK are updated due to expiration of each TEK lifetime.

16. The apparatus of claim 14, wherein the first TEK and the second TEK are generated using a Dot16KDF algorithm.

17. The apparatus of claim 14, wherein the first TEK count and the second TEK count are reset if the AK is newly generated.

18. The mobile station of claim 14, wherein the AK is generated based on the temporary ID.

* * * * *